United States Patent [19] [11] 4,301,069
Weaver et al. [45] Nov. 17, 1981

[54] AZO DYES FROM FIVE MEMBERED RING HETEROCYCLIC AMINES AND ANILINE, TETRAHYDROQUINOLINE AND BENZOMORPHOLINE COUPLERS CONTAINING THIOSULFATE ALKYL GROUPS

[75] Inventors: Max A. Weaver; Clarence A. Coates, Jr., both of Kingsport, Tenn.

[73] Assignee: Eastman Kodak Company, Rochester, N.Y.

[21] Appl. No.: 159,092

[22] Filed: Jun. 13, 1980

[51] Int. Cl.³ .................. C09B 27/033; C09B 29/036; C09B 29/039; C09B 29/042; C09B 29/048
[52] U.S. Cl. .................................... 260/152; 260/155; 260/157; 260/158; 260/162; 260/163
[58] Field of Search ............... 260/152, 155, 157, 158, 260/162, 163

[56] References Cited

U.S. PATENT DOCUMENTS

| | | | |
|---|---|---|---|
| 2,659,719 | 11/1953 | Dickey et al. | 260/158 |
| 2,683,709 | 7/1954 | Dickey et al. | 260/158 |
| 3,226,395 | 12/1965 | Schimmelschmidt et al. | 260/158 X |
| 3,870,696 | 3/1975 | Feeman | 260/158 |
| 4,180,503 | 12/1979 | vor der Bruck et al. | 260/165 X |

Primary Examiner—Floyd D. Higel

Attorney, Agent, or Firm—Donald W. Spurrell; Daniel B. Reece, III

[57] ABSTRACT

Disclosed are mono azo dyes derived from diazotized 5-membered heterocyclic amines and certain aniline, 1,2,3,4-tetrahydroquinoline, and benzomorpholine couplers containing thiosulfate alkyl groups. These dyes are useful for dyeing synthetic fibers, cellulose acetate and wool, and particularly impart fast violet to blue shades on polyamide fibers, and in general, exhibit improved properties such as fastness to light, sublimation, ozone, oxides of nitrogen, perspiration, crock, and wash, and exhibit excellent build, pH stability, bloom resistance, depth of shade, leveling, migration, and the like. The dyes have the general formula:

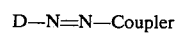

D—N=N—Coupler wherein D is a thiadiazol, isothiazol, pyrazol or thiophene type radical, and the Coupler is an aniline, tetrahydroquinoline, or benzomorpholine derivative wherein a —$ZSSO_3M$ group is attached to the nitrogen thereof, the coupler ring may contain substituents such as alkyl, alkoxy, halogen, acylamido, alkylthio or aryloxy, the remaining hydrogen of the aniline coupler may be replaced by a substituent such as alkyl, substituted alkyl, alkenyl, aryl, or cycloalkyl, M is $Na^+$, $K^+$, $NH_4^+$ or $H^+$, and Z is a linking group such as ethylene.

11 Claims, No Drawings

AZO DYES FROM FIVE MEMBERED RING HETEROCYCLIC AMINES AND ANILINE, TETRAHYDROQUINOLINE AND BENZOMORPHOLINE COUPLERS CONTAINING THIOSULFATE ALKYL GROUPS

This invention concerns mono azo dyes derived from diazotized 5-membered heterocyclic amines and certain aniline, 1,2,3,4-tetrahydroquinoline, and benzomorpholine couplers containing thiosulfate alkyl groups. These dyes are useful for dyeing synthetic fibers, cellulose acetate and wool, and particularly impart fast violet to blue shades on polyamide fibers. The dyes, in general, exhibit improved properties such as fastness to light, sublimation, ozone, oxides of nitrogen, perspiration, crock, and wash, and exhibit excellent build, pH stability, bloom resistance, depth of shade, leveling, migration, and the like.

The dyes of this invention have the general formula:

D—N=N—Coupler wherein D is a thiadiazol, isothiazol, pyrazol or thiophene type radical, and the Coupler is an aniline, tetrahydroquinoline, or benzomorpholine derivative wherein a —ZSSO$_3$M group is attached to the nitrogen thereof, the coupler ring may contain substituents such as alkyl, alkoxy, halogen, acylamido, alkylthio or aryloxy, the remaining hydrogen of the aniline coupler may be replaced by a substituent such as alkyl, substituted alkyl, alkenyl, aryl, or cycloalkyl, M is Na$^+$, K$^+$, NH$_4^+$ or H$^+$, and Z is a linking group such as ethylene.

More specifically, the Coupler is of the formulae

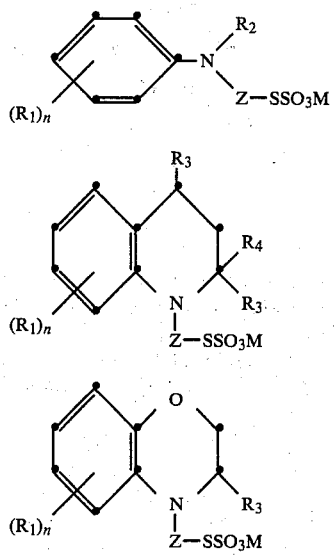

wherein R$_1$ is selected from hydrogen; alkyl; halogen; alkoxy; aryloxy; —NHCO—R$_5$; —NHSO$_2$—R$_5$; wherein R$_5$ is selected from alkyl which may be substituted with hydroxy, alkoxy, cyano, aryloxy, aryl, halogen, cycloalkyl, alkylcarbonyloxy, or carbamoyl; aryl; alkylamino; and 2-furyl; R$_2$ is selected from hydrogen; aryl; cycloalkyl; and alkyl which may be substituted with alkoxy, alkoxyalkoxy, hydrogen, aryloxy, aryl, cycloalkyl, alkylcycloalkyl, furyl, acylamido, aryloxy, carbamoyl, alkoxycarbonyl, alkyl substituted carbamoyl, cyano, alkanoyloxy, halogen, alkoxycarbonyl, succinimido, glutarimido, phthalimido, 2-pyrrolidono, sulfamoyl, alkyl substituted sulfamoyl, alkylsulfonamido, NHSO$_2$-aryl, NHCOO-alkyl, NHCONH-alkyl, formamido, alkylsulfonyl, arylsulfonyl, alkylthio, arylthio or SO$_3$M; n is 0, 1 or 2; M is Na$^+$, K$^+$, NH$_4^+$, or H$^+$; R$_3$ and R$_4$ are each selected from hydrogen or alkyl; Z is selected from straight or branched chain alkylene; alkylene substituted with aryl, aryloxy, alkoxy, halogen, aryloxy or SO$_3$M; —CH$_2$(CH$_2$)$_m$—X—CH$_2$(CH$_2$)$_p$, where m is 1, 2, or 3, p is 0, 1, 2 or 3, and X is O, S, SO$_2$, —SO$_2$NH—,

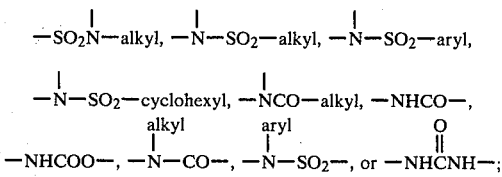

the various aryl groups above may be substituted with alkyl, alkoxy, or halogen; and each of the above alkyl, alkylene, alkoxy, alkenyl and the like moieties contain from 1–6 carbons.

The heterocycle D is of the formulae

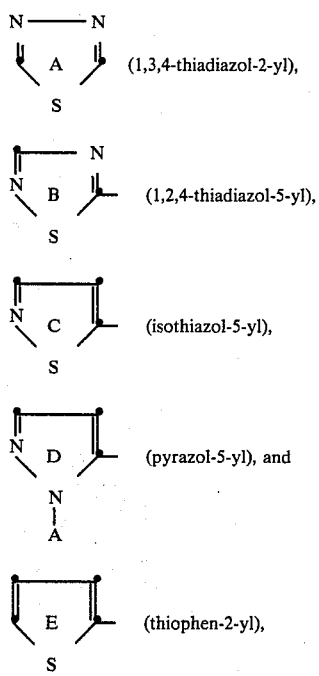

wherein
ring A may bear a substituent selected from alkyl, substituted alkyl, alkoxy, halogen, alkylsulfonyl, SO$_2$-aryl, SO$_2$NH$_2$, SO$_2$NH-alkyl, SO$_2$N-(di-alkyl), substituted SO$_2$NH-alkyl, acylamido, aryl, arylthio, alkenylthio, cyclohexylthio, thiocyano, cyclohexylsulfonyl, alkylthio, substituted alkylthio and cyclohexyl;

ring B may bear a substituent selected from alkyl, substituted alkyl, aryl, alkylthio, cyclohexylthio, substituted alkylthio and alkylsulfonyl;

ring B may bear a substituent selected from alkyl, substituted alkyl, aryl, alkylthio, cyclohexylthio, substituted alkylthio and alkylsulfonyl;

ring C may bear one or two substituents selected from alkyl, substituted alkyl, halogen, cyano, carbamoyl, CONH-alkyl, substituted CONH-alkyl, alkoxycarbonyl, alkylthio, substituted alkylthio, alkenylthio, arylthio, cyclohexylthio, S-heterocycle, aryloxy, and alkoxy;

ring D may bear one or two substituents selected from alkyl, substituted alkyl, alkoxycarbonyl, alkylthio, aryl, cyano, carbamoyl, alkyl carbamoyl, alkylcarbonyl, substituted alkyl carbamoyl, and alkyl sulfonyl; and the A group on the 1-nitrogen of ring D may be hydrogen, alkyl, alkoxycarbonyl, aryl, alkylsulfonyl, arylsulfonyl, or alkanoyl;

ring E may be substituted with one to three substituents selected from alkyl, substituted alkyl, cyano, alkoxycarbonyl, acyl, aroyl, alkylsulfonyl, arylsulfonyl, carbamoyl, alkyl carbamoyl, substituted alkyl carbamoyl, aryl, halogen, sulfamoyl, substituted alkyl, and formyl;

wherein the various alkyl, alkylene, alkoxy and other such moieties contain from 1-6 carbons and may bear one to three substituents selected from hydroxy, halogen, alkoxy, aryl, aryloxy, cyclohexyl, alkylcyclohexyl, acyloxy, alkoxy carbonyl, acylamido, alkylsulfonamido, succinimido, glutarimido, phthalimido, 2-pyrrolidono, cyano, carbamoyl, alkoxy-alkoxy, alkylthio, halogen, arylthio, alkylsulfonyl and arylsulfonyl;

and wherein the various aryl groups may be substituted with one to three substituents selected from alkyl, alkoxy, halogen, alkoxy carbonyl, alkyl sulfonyl, and alkylthio.

The following couplers are particularly valuable in the practice of this invention.

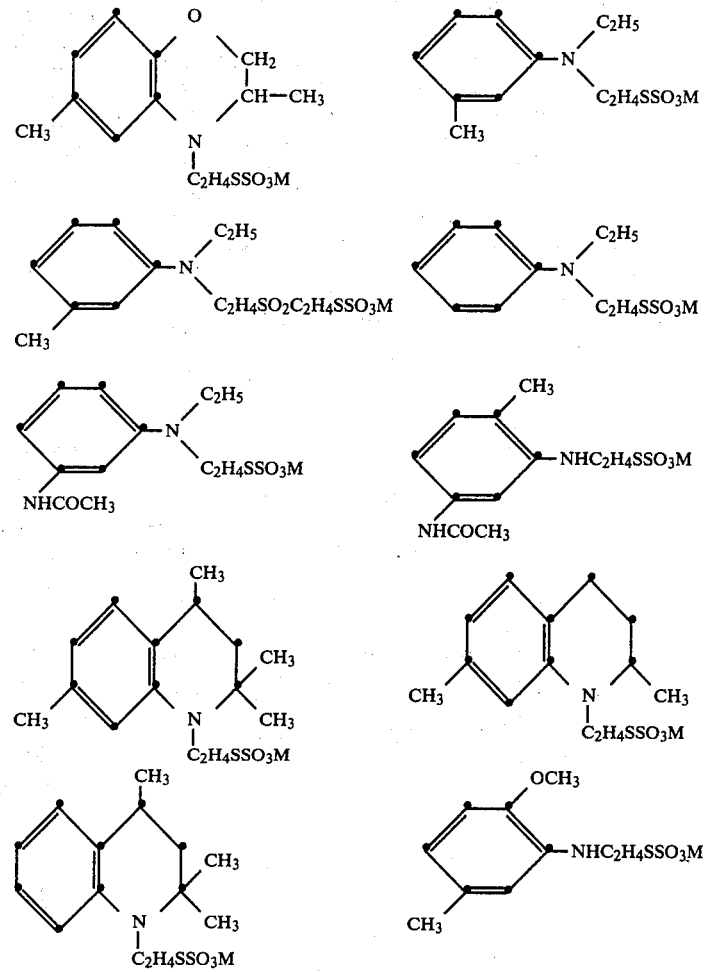

The couplers of this invention are prepared by reacting N-chloro (or bromo) alkyl aromatic amines with an alkali thiosulfate salt.

The following coupler intermediates are typical of those appropriate for reacting with sodium thiosulfate.

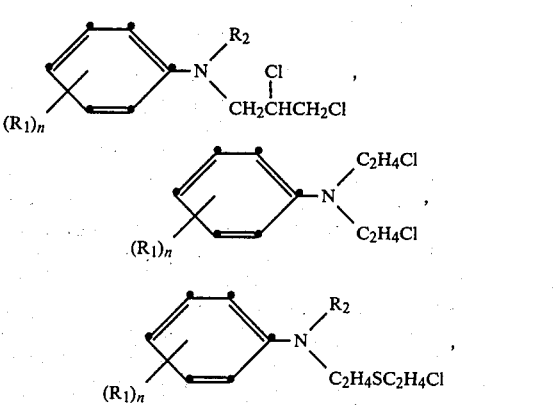

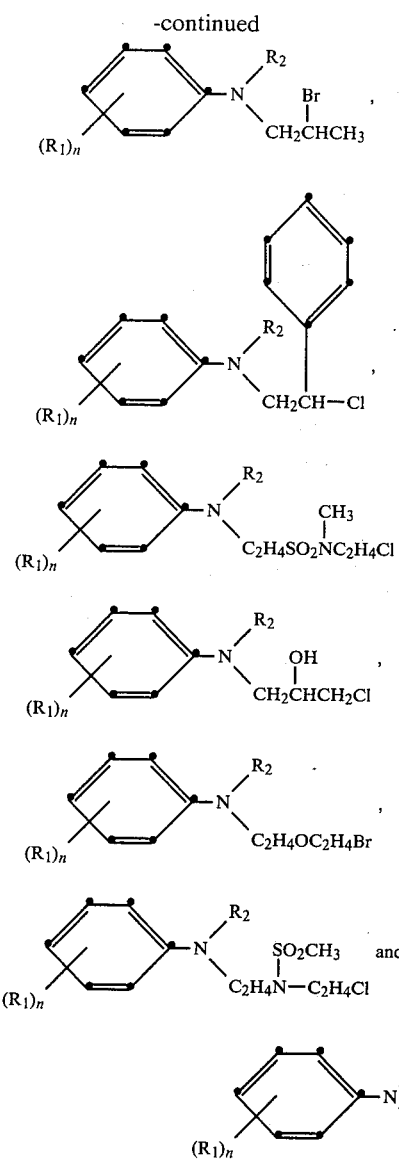

The halogen containing couplers are in general prepared by reacting the corresponding known hydroxy compounds with POCl₃, SOCl₂, POBr₃, PBr₃, and the like by methods well known in the art. The tetrahydroquinoline and benzomorpholine intermediates are similarly prepared.

This invention will be further illustrated by the following examples although it will be understood that these examples are included merely for purposes of illustration and are not intended to limit the scope of the invention.

Preparation of Typical Couplers

EXAMPLE 1

Sodium S-2-[ethyl(3-methylphenyl)amino] ethyl thiosulfate

Sodium thiosulfate (49.6 g, 0.2 m), sodium iodide (1 g), N-2-chloroethyl-N-ethyl-m-toluidine (19.8 g, 0.1 m), and 200 ml water were mixed and heated at about 95° C. for about 1½ hrs. The reaction mixture was cooled to about 20° C. and filtered. The white solid was washed with hexane and dried in air. Yield—26.0 g (87.5%).

EXAMPLE 2

Sodium S-2-(1,2,3,4-tetrahydro-2,2,4,7-tetramethyl-1-quinolinyl)ethyl thiosulfate A mixture of sodium thiosulfate (49.6 g, 0.2 m), sodium iodide (1 g), N-(2-chloroethyl)-2,2,4,7-tetramethyl-1,2,3,4-tetrahydroquinoline (25.2 g, 0.1 m), water (100 ml), and ethanol (100 ml) was refluxed fro 3 hrs. The mixture was cooled and extracted with 2–75 ml portions of toluene. The aqueous layer then contained essentially pure product and aliquots were used to prepare dyes without further purification.

EXAMPLE 3

Sodium S-2(3,4-dihydro-3,6-dimethyl-2H-1,4-benzoxazin-4-yl)ethyl thiosulfate

Sodium thiosulfate (0.2 m), sodium iodide (1 g), N-(2-chloroethyl)-3,6-dimethyl-2H-1,4-benzoxazine, water (150 ml), and ethanol (75 ml) were mixed and heated at reflux for 3 hrs. The alcohol was distilled off and the reaction mixture was cooled. The product, a white solid, was collected by filtration and dried in air. The yield was essentially quantitative. Preparation of the Dyes

EXAMPLES 4–8

Diazotization and Coupling of 2-Amino-5-ethylthio-1,3,4-thiadiazole

Sodium nitrite (3.6 g.) is added portionwise to 25 ml of concentrated H₂SO₄. The solution is cooled and 100 ml of 1:5 acid (1 part propionic :1 part acetic) is added below 15° C. The mixture is cooled and 8.05 g. (0.05 m) of 2-amino-5-ethylthio-1,3,4-thiadiazole is added below 10° C. After stirring at 0°–5° C. for 2 hrs., a 0.005 m aliquot of the diazonium salts is added to 0.005 m of the following couplers in water or dilute sulfuric acid, keeping the temperature below 5° C.

EXAMPLE 4

Sodium S-2[ethyl(3-methylphenyl)amino]ethyl thiosulfate

EXAMPLE 5

Sodium S-2[ethyl(phenyl)amino]ethyl thiosulfate

EXAMPLE 6

Sodium S-2-(1,2,3,4-tetrahydro-2,2,4,7-tetramethyl-1-quinolinyl)ethyl thiosulfate

EXAMPLE 7

Sodium S-2-(2,7-dimethyl-1,2,3,4-tetrahydro-1-quinolinyl)ethyl thiosulfate

EXAMPLE 8

Sodium S-2-(3,4-dihydro-3,6-dimethyl-2H-1,4-benzoxazin-4-yl)ethyl thiosulfate

The mineral acid is neutralized with sodium acetate and the coupling mixture allowed to stand for 1 hr. Water is added to make a total volume of 200–300 ml. and the dyes are collected by filtration, washed with water, and dried in air.

The dyes usually contain about an equal weight of dye and sodium sulfate as they are isolated and are used for dying polyamide fibers red shades without further purification.

EXAMPLES 9–13

Diazotization of 5-Amino-3-ethylthio-1,2,4-thiadiazole

5-Amino-3-ethylthio-1,2,4-thiadiazole (8.05 g., 0.05 m) is diazotized exactly as described in Examples 4–8 and a 0.005 m aliquot coupled to 0.005 m portion of the couplers of Examples 4–8 in the manner previously illustrated.

EXAMPLES 14–18

Diazotization of 5-Amino-3-methyl-4-cyano isothiazole

To 25 ml of concentrated $H_2SO_4$ is added 3.6 g. of $NaNO_2$ allowing the temperature to rise. The solution is cooled and 50 ml of 1:5 acid is added below 10° C. Stirring is continued and 6.95 g. (0.05 m) of 5-amino-3-methyl-4-cyanoisothiazole is added below 5° C., followed by an additional 50 ml of 1:5 acid. After stirring at 0°–5° C. for 2 hrs., a 0.005 m aliquot of the diazonium salt is coupled to 0.005 m of the couplers of Examples 4–8 as previously described to produce rubine to violet dyes for polyamides.

EXAMPLES 19–23

Diazotization of 5-Amino-4-carbomethoxypyrazole

Nitrosyl sulfuric acid is prepared by adding 3.6 g. $NaNO_2$ to 25 ml of concentrated $H_2SO_4$. The solution is cooled and 100 ml of 1;5 acid is below 20° C. After further cooling, 5-amino-4-carbomethoxypyrazole (7.05 g., 0.05 m) is added at 0°–5° C. and stirring continued for 2 hrs. A 0.005 m aliquot of the diazonium solution is coupled to 0.005 m. of the couplers of Examples 4–8 in the manner previously described to produce red dyes for polyamides.

EXAMPLES 24–28

Diazotization of 2-Amino-3-carbomethoxy-5-isobutyrylthiophene

To 150 g. of 60% aqueous acetic acid is added 11.35 g. (0.05 m) of 2-amino-3-carbomethoxy-5-isobutyrylthiophene at room temperature. Ten grams of concentrated $H_2SO_4$ is added and the mixture cooled to 0° C. A solution of 3.6 g $NaNO_2$ in 25 ml of conc. $H_2SO_4$ is added below 10° C. and stirring continued for 1 hr. at 0°–5° C. A 0.005 m aliquot of this diazonium salt is coupled to 0.005 m portions of the couplers of Examples 4–8 as previously illustrated to produce violet to reddish-blue dyes for polyamides.

The following tables of dyes will further illustrate the invention.

TABLE 1

$$R-\underset{S}{\underset{|}{\overset{N-N}{\diagup\diagdown}}}-N=N-\underset{(R_1)_m}{\diagdown\diagup}-N\underset{ZSSO_3M}{\overset{R_2}{\diagdown}}$$

| R | $(R_1)_m$ | $R_2$ | Z | M |
|---|---|---|---|---|
| 5-$CH_3$ | 2-$CH_3$ | H | —$CH_2CH_2$— | $K^+$ |
| 5-$CH_2CH_3$ | 2-Cl | " | " | " |
| 5-$CH_2CH(CH_3)$ | 2,5-di-Cl | " | " | " |
| 5-$C_6H_5$ | 2,5-di-$CH_3$ | " | " | " |
| 5-$C_6H_{11}$ | 2,5-di-$OCH_3$ | " | " | " |
| 5-$C_6H_4$—p-Cl | 3-$OCH_3$ | —$C_2H_5$ | " | " |
| 5-$C_6H_4$—o-$CH_3$ | 2-$OCH_3$, 5-$NHCOCH_3$ | H | " | " |
| 5-$C_6H_4$—m-$OCH_3$ | 2-$CH_3$, 3-Cl | " | " | " |
| 5-$SCH_3$ | 2-$OCH_3$, 5-Cl | " | " | " |
| " | 3-$NHCOCH_3$ | —$C_2H_5$ | " | " |
| " | 3-$NHCOC_2H_5$ | —$C_2H_4OCH_3$ | " | " |
| " | 3-$NHCOCH_2OH$ | —$CH_2C_6H_5$ | " | " |
| " | 3-$NHCOCH_2OCH_3$ | —$C_6H_{11}$ | " | " |
| H | 3-$NHCOC_6H_5$ | —$CH_2C_6H_{11}$ | " | " |
| " | 3-$NHCOOC_2H_5$ | —$CH_2CH_2OC_6H_5$ | " | " |
| " | 3-$NHCONHC_2H_5$ | —$CH_2CH_2OH$ | " | " |
| 5-$OC_2H_5$ | 3-$NHCOC_6H_{11}$ | —$CH_2CH(CH_3)_2$ | " | " |
| 5-$SC_2H_5$ | 3-$NHCOCH_2CN$ | —$CH_2CH_2CH_2CH_3$ | " | " |
| " | 3-$NHCOCH_2OC_6H_5$ | —$CH_2CH_2OCOCH_3$ | " | " |
| " | 3-$NHCOCH_2C_6H_5$ | —$CH_2CH_2CONH_2$ | " | " |
| " | 3-$CH_3$ | —$CH_2CH_2NHCOCH_3$ | " | " |
| " | " | —$CH_2CH_2NHSO_2CH_3$ | " | " |
| " | " | —$CH_2CH_2SO_2NH_2$ | " | " |
| " | " | —$CH_2CH_2CH_2SO_2CH_3$ | " | " |
| 5-Cl | " | —$CH_2CH_2SCH_3$ | " | " |
| 5-$SO_2CH_3$ | H | —$CH_2CH_2N\diagup\diagdown\underset{COCH_2}{\overset{COCH_2}{\phantom{x}}}$ | —$CH_2CH_2CH_2$— | $Na^+$ |
| 5-$OC_4H_9$—n | " | —$CH_2CH_2CH_2N\diagup\diagdown\underset{CH_2CH_2}{\overset{CO—CH_2}{\phantom{x}}}$ | " | " |

TABLE 1-continued

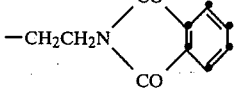

| R | (R₁)ₘ | R₂ | Z | M |
|---|---|---|---|---|
| 5-SCH₂CH₂OH | 3-OC₆H₅ | —CH₂CH₂N(CO)₂C₆H₄ (phthalimide) | " | NH₄⁺ |
| 5-SCH₂CH₂COOCH₃ | 3-CH₃ | —C₆H₅ | —CH₂CH₂— | Na⁺ |
| 5-S—CH₂CH₂OCCH₃ (O) | " | —CH₂-(furan) | —CH₂CH(CH₂OC₆H₅)— | " |
| 5-SCH₂SC₆H₅ | " | —CH₂CH₂COOCH₃ | —CH₂CH(C₆H₅)— | " |
| 5-SO₂CH₃ | " | —CH₂CH₂CN | —CH₂CH(CH₃)— | " |
| 5-SO₂NH₂ | " | —C₂H₅ | —CH₂CH(OH)CH₂— | " |
| 5-SO₂NHC₂H₅ | 2-CH₃S | H | —CH₂CH₂CH₂CH₂— | " |
| 5-SCN | 3-CH₃ | —C₂H₄OC₂H₄OC₂H₅ | —CH₂CH(OCOCH₃)CH₂— | " |
| 5-SO₂N(CH₃)₂ | " | —CH₂CH(OH)CH₂Cl | —CH₂CH₂— | " |
| 5-SO₃C₆H₅ | 2-OCH₃, 5-CH₃ | C₂H₅ | " | " |
| 5-SCH₂CH=CH₂ | " | H | —CH₂CH₂OCH₂CH₂— | " |
| 5-SCH₂CH₂OCH₃ | " | H | " | " |
| 5-SCH₂CH₂N(COCH₂)₂ (succinimide) | " | " | —CH₂CH₂SO₂CH₂CH₂— | K⁺ |
| 5-SC₆H₁₁ | 3-CH₃ | C₂H₅ | —CH₂CH₂SCH₂CH₂— | " |
| 5-SC₆H₅ | " | " | —CH₂CH₂N(SO₂CH₃)CH₂CH₂— | " |
| 5-SO₂C₆H₅ | " | " | —CH₂CH₂NHSO₂CH₂CH₂CH₂CH₂— | " |
| 5-I | " | " | —CH₂CH₂SO₂NHCH₂CH₂— | " |
| 5-Br | " | " | —CH₂CH₂N(COCH₃)CH₂CH₂— | " |
| | " | " | —CH₂CH₂CONHC₂H₄— | " |
| 5-SCH₂CH₂N(CO—CH₂)(CH₂CH₂) | " | " | | " |
| 5-SCH₂CH₂NHSO₂CH₃ | " | " | —CH₂CH₂NHCOCH₂— | " |
| 5-SCH₂CH₂NHCOCH₃ | " | " | —CH₂CH₂N(SO₂C₆H₅)CH₂CH₂— | " |
| 5-SCH₂CH₂OC₆H₅ | " | " | —CH₂CH₂SO₂N(CH₃)CH₂CH₂— | " |
| 5-SCH₂CH₂C₆H₅ | " | " | —CH₂CH₂SO₂N(C₆H₅)CH₂CH₂— | " |
| 5-SCH₂CH₂OC₂H₅ | " | " | —CH₂CH₂N(SO₂C₆H₁₁)CH₂CH₂— | " |
| 5-SO₂C₆H₁₁ | " | " | —CH₂CH₂N(COCH₃)CH₂CH₂— | " |
| 5-CH₃ | " | " | —CH₂CH(CH₂OCH₃)— | " |
| " | " | " | —CH₂CH(Cl)CH₂ | " |
| " | " | " | —CH₂CH₂NHCONHC₂H₄— | " |
| 5-NHCOCH₃ | " | " | —CH₂CH₂NHCOOCH₂CH₂— | " |
| " | " | " | —CH₂CH₂COOCH₂CH₂— | " |

TABLE 2

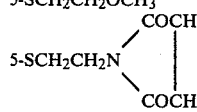

| R | (R₁)ₘ | R₃ | R₄ | Z | M |
|---|---|---|---|---|---|
| H | H | CH₃ | CH₃ | —CH₂CH₂— | K⁺ |
| " | 7-CH₃ | " | " | " | " |
| " | 7-OCH₃ | " | " | " | " |
| 5-CH₃ | 7-Cl | " | " | " | " |
| 5-CH₂CH₃ | 5-CH₃, 8-OCH₃ | " | " | " | " |
| 5-CH(CH₃)₂ | 5,8-di-OCH₃ | " | " | " | " |
| 5-CH₂CH(CH₃)₂ | 5,8-di-CH₃ | " | " | " | " |
| 5-C₆H₅ | 5-Cl, 8-OCH₃ | " | " | " | " |
| 5-C₆H₁₁ | 8-OCH₃ | " | " | " | " |
| 5-C₆H₄—o-Cl | 8-OC₂H₅ | H | H | " | " |
| 5-C₆H₄—n-CH₃ | 7-CH₃ | " | " | " | " |
| 5-C₆H₄—p-OCH₃ | 7-NHCOCH₃ | CH₃ | CH₃ | " | Na⁺ |
| 5-OC₂H₅ | 7-NHCOH | " | " | " | " |
| " | 7-NHCOCH₂OCH₃ | " | " | " | " |

TABLE 2-continued

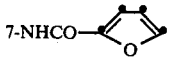

| R | (R₁)m | R₃ | R₄ | Z | M |
|---|---|---|---|---|---|
| " | 7-NHCOCH$_2$OC$_6$H$_5$ | H | CH(CH$_3$)$_2$ | " | " |
| " | 7-NHCOCH$_2$C$_6$H$_5$ | " | " | " | " |
| " | 7-NHCOCH$_2$Cl | " | " | " | " |
| " | 7-NHCOC$_6$H$_5$ | " | " | " | " |
| " | 7-NHCOC$_6$H$_{11}$ | CH$_3$ | CH$_3$ | " | " |
| 5-Cl | 7-NHCONHC$_2$H$_5$ | " | " | " | " |
| " | 7-NHSO$_2$CH$_3$ | " | " | " | " |
| " | 7-NHCOCH$_2$CN | " | " | " | " |
| " | 7-NHCOCH$_2$OH | " | " | " | " |
| 5-I | 7-NHCOOC$_2$H$_5$ | " | " | —CH$_2$CH$_2$CH$_2$— | " |
| 5-Br | 7-NHCOCH$_2$CH$_2$OCOCH$_3$ | " | " | " | " |
| 5-SO$_2$CH$_3$ | 8-OC$_4$H$_9$—n | H | CH$_3$ | —CH$_2$CH$_2$— | " |
| 5-SO$_2$NH$_2$ | 7-CH$_3$ | CH$_3$ | H | " | " |
| 5-SO$_2$N(CH$_3$)$_2$ | " | " | CH$_3$ | " | " |
| | 7-NHCO-(furan) | | | | |
| 5-SO$_2$N(C$_2$H$_5$)$_2$ | 7-OC$_2$H$_5$ | " | " | " | " |
| 8-SO$_2$NHC$_3$H$_6$OCH$_3$ | 7-OC$_4$H$_9$—n | " | " | " | " |
| 5-SO$_2$CH$_2$CH$_2$OC$_2$H$_5$ | 7-CH$_3$ | " | H | " | " |
| 5-SC$_6$H$_5$ | " | " | " | " | " |
| 5-SC$_6$H$_{11}$ | " | " | " | —CH$_2$CH$_2$CH$_2$CH$_2$— | " |
| 5-SO$_2$C$_6$H$_5$ | " | " | " | —CH$_2$CH$_2$— | " |
| 5-SO$_3$C$_6$H$_5$ | " | " | " | " | " |
| 5-SCH$_2$CH$_2$OH | " | " | " | " | " |
| 5-SCH$_2$CH=CH$_3$ | " | " | " | —CH$_2$CH$_2$SO$_2$CH$_2$CH$_2$— | K⁺ |
| 5-SCH$_2$COOC$_2$H$_5$ | " | " | " | —CH$_2$CH$_2$OCH$_2$CH$_2$— | " |
| 5-SCH$_2$C$_6$H$_5$ | " | " | " | —CH$_2$CH$_2$SCH$_2$CH$_2$— | " |
| 5-SCH$_2$C$_6$H$_{11}$ | " | " | " | —CH$_2$CH(C$_6$H$_5$)— | " |
| 5-SCH$_2$CH$_2$OC$_2$H$_5$ | " | " | " | —CH$_2$CH(CH$_3$)— | " |
| 5-SCN | " | " | " | —CH$_2$CH(OH)CH$_2$— | " |
| 5-SCH$_2$CH$_2$NHCOCH$_3$ | " | " | " | —CH$_2$CH(Cl)CH$_2$— | " |
| 5-SCH$_2$CH$_2$N(COCH$_2$)$_2$ (succinimide) | " | " | " | —CH$_2$CH(CH$_2$OCH$_2$CH$_3$)— | " |
| 5-SCH$_2$CH$_2$OC$_6$H$_5$ | " | " | " | —CH$_2$CH(CH$_2$OC$_6$H$_5$)— | " |
| 5-SCH$_2$CH$_3$ | " | " | " | —CH$_2$CH$_2$N(SO$_2$CH$_3$)CH$_2$CH$_2$— | " |
| " | " | " | " | —CH$_2$CH$_2$CH$_2$NHSO$_2$CH$_2$CH$_2$— | " |
| " | " | " | " | —CH$_2$CH$_2$SO$_2$NHCH$_2$CH$_2$— | " |
| " | " | " | " | —CH$_2$CH$_2$NHCOCH$_2$— | " |
| " | " | " | " | —CH$_2$CH$_2$NHCOOCH$_2$CH$_2$— | " |
| " | " | " | " | —CH$_2$CH$_2$COOCH$_2$CH$_2$— | " |
| " | " | " | " | —CH$_2$CH$_2$CONHC$_2$H$_4$— | " |
| 5-SCH$_3$ | " | " | " | —CH$_2$CH$_2$NHCONHC$_2$H$_4$— | " |
| " | " | " | " | —CH$_2$CH$_2$N(SO$_2$C$_6$H$_5$)CH$_2$CH$_2$— | " |
| " | " | " | " | —CH$_2$CH$_2$N(COCH$_3$)CH$_2$CH$_2$— | " |
| " | " | " | " | —CH$_2$CH$_2$SO$_2$N(C$_6$H$_5$)CH$_2$CH$_2$— | " |
| 5-NHCOCH$_3$ | " | " | " | —CH$_2$CH$_2$SO$_2$N(CH$_3$)CH$_2$CH$_2$— | " |

TABLE 3

| R | (R₁)m | R₃ | Z | M |
|---|---|---|---|---|
| H | 6-CH$_3$ | H | —CH$_2$CH$_2$— | K⁺ |
| " | H | H | " | " |
| " | " | CH$_3$ | " | " |
| 5-CH$_3$ | 6-CH$_3$ | " | " | " |
| 5-CH(CH$_3$)$_2$ | " | " | —CH$_2$CH$_2$CH$_2$CH$_2$— | " |

TABLE 3-continued

Structure: R-[thiadiazole(N-N,S)]-N=N-[phenyl ring with (R₁)m substituent]-O-CH(R₃)-CH(N-ZSSO₃M)

| R | (R₁)m | R₃ | Z | M |
|---|---|---|---|---|
| 5-CH₂CH(CH₃)₂ | 6-OCH₃ | " | " | " |
| 5-C₆H₅ | " | " | —CH₂CH₂— | " |
| 5-C₆H₄—p-Cl | 6-CH₃ | " | —CH₂CH₂OCH₂CH₂— | " |
| 5-C₆H₄—p-OCH₃ | " | " | —CH₂CH₂SO₂CH₂CH₂— | " |
| 5-C₆H₄—n-CH₃ | " | " | —CH₂CH₂SCH₂CH₂— | " |
| 5-OC₂H₅ | " | " | —CH₂CH(CH₃) | " |
| 5-OCH(CH₃)₂ | " | " | —CH₂CH(C₆H₅)— | " |
| 5-C₆H₁₁ | 6-OC₂H₅ | " | —CH₂CH₂— | " |
| 5-SCN | 6-NHCOCH₃ | " | " | Na⁺ |
| 5-SCH₃ | 6-NHCOH | " | " | " |
| 5-SCH₂CH(CH₃)₂ | 6-NHCOCH₂OCH₃ | " | " | " |
| 5-SCH₂CH=CH₂ | 6-NHCOCH₂Cl | " | " | " |
| 5-SC₆H₁₁ | 6-NHCOCH₂CN | " | " | " |
| 5-SC₆H₅ | 6-NHCOCH₂CONH₂ | " | " | " |
| 5-SCH₂C₆H₅ | 6-NHCOCH₂OC₆H₅ | " | " | " |
| 5-SCH₂CH₂OC₆H₅ | 6-NHCOOC₂H₅ | " | " | " |
| 5-SCH₂CH₂OC₂H₅ | 6-NHCONHC₂H₅ | " | " | " |
| 5-SCH₂CH₂OH | 6-NHCOC₆H₅ | " | " | " |
| 5-SCH₂CH₂Cl | 6-NHCOC₆H₁₁ | " | " | " |
| 5-SCH₂COOC₂H₅ | 6-NHSO₂CH₃ | " | " | " |
| 5-SCH₂CH₂OCOCH₃ | 6-NHCOCH₂CH₂OCOCH₃ | " | " | " |
| 5-SCH₂C₆H₁₁ | 6-NHCO-(furyl) | " | " | " |
| 5-SO₂CH₃ | 6-NHCOCH₂CH₂CH₂OH | " | " | " |
| 5-SO₂C₄H₉—n | 6-CH₃ | " | —CH₂CH₂CH₂— | " |
| 5-SO₂CH₂CH₂OCH₃ | " | " | —CH₂CH₂— | " |
| 5-SO₂C₆H₅ | " | " | " | " |
| 5-SO₂C₆H₁₁ | " | " | " | " |
| 5-SO₂CH₂C₆H₅ | " | " | " | " |
| 5-SO₂CH₂CH₂OH | " | " | " | " |
| 5-SCH₂CH₂N(COCH₂)(COCH₂) (succinimide) | " | " | " | " |
| 5-SCH₂CH₂NHCOCH₃ | " | " | " | " |
| 5-SCH₂CH₂N(CO—CH₂)(CH₂CH₂) (pyrrolidinone) | " | H | —CH₂CH(CH₃)— | " |
| 5-SO₂NH₂ | " | CH₃ | —CH₂CH₂N(SO₂CH₃)CH₂CH₂— | K⁺ |
| 5-SO₂NHC₃H₆OCH₃ | " | " | —CH₂CH₂SO₂NHCH₂CH₂— | " |
| 5-SO₂NHCH₃) | " | " | —CH₂CH₂SO₂N(CH₃)CH₂CH₂CH₂— | " |
| 5-SO₂NHC₂H₅ | " | " | —CH₂CH₂SO₂N(C₆H₅)CH₂CH₂— | " |
| 5-SO₂NHC₆H₁₁ | " | " | —CH₂CH₂SO₂N(C₆H₁₁)CH₂CH₂— | " |
| 5-SO₃C₆H₅ | " | " | —CH₂CH₂CH₂CH₂N(SO₂CH₃)CH₂CH₂— | " |
| 5-SO₂NHC₆H₅ | " | " | —CH₂CH₂N(SO₂C₆H₄—p-CH₃)—CH₂CH₂— | " |
| 5-NHCOCH₃ | " | " | —CH₂CH₂N(SO₂C₆H₁₁)CH₂CH₂— | " |
| 5-SC₂H₅ | " | " | —CH₂CH(Cl)CH₂— | " |
| " | " | " | —CH₂CH(OH)CH₂— | " |
| " | " | " | —CH₂CH(CH₂OCH₃)— | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂CH₂— | " |
| " | " | " | —CH₂CH₂N(COCH₃)CH₂CH₂— | " |
| " | " | " | —CH₂CH₂N(COC₆H₅)CH₂CH₂— | " |

TABLE 4

[Structure: thiazole-N=C(R)-N=N-phenyl(R1)m-N(R2)-Z-SSO3M]

| R | (R1)m | R2 | Z | M |
|---|---|---|---|---|
| 3-CH3 | 2-CH3 | H | —CH2CH2— | K+ |
| " | 2-Cl | " | " | " |
| " | 2,5-di-Cl | " | " | " |
| " | 2,5-di-CH3 | " | " | " |
| " | 2,5-di-OCH3 | " | " | " |
| " | 3-OCH3 | —C2H5 | " | " |
| " | 2-OCH3, 5-NHCOCH3 | H | " | " |
| 3-SCH3 | 2-CH3, 3-Cl | " | " | " |
| 3-C6H5 | 2-OCH3, 5-Cl | " | " | " |
| 3-C6H4—p-Cl | 3-NHCOCH3 | —C2H5 | " | " |
| 3-C6H4—o-CN | 3-NHCOC2H5 | —C2H4OCH3 | " | " |
| " | 3-NHCOCH2OH | —CH2C6H5 | " | " |
| " | 3-NHCOCH2OCH3 | —C6H11 | " | " |
| " | 3-NHCOC6H5 | —CH2C6H11 | " | " |
| " | 3-NHCOOC2H5 | —CH2CH2OC6H5 | " | " |
| " | 3-NHCONHC2H5 | —CH2CH2OH | " | " |
| " | 3-NHCOC6H11 | —CH2CH(CH3)2 | " | " |
| 3-C6H5 | 3-NHCOCH2CN | —CH2CH2CH2CH3 | " | " |
| " | 3-NHCOCH2OC6H5 | —CH2CH2OCOCH3 | " | " |
| " | 3-NHCOCH2C6H5 | —CH2CH2CONH2 | " | " |
| " | 3-CH3 | —CH2CH2NHCOCH3 | " | " |
| " | " | —CH2CH2NHSO2CH3 | " | " |
| 3-C6H4—p-CH2 | " | —CH2CH2SO2NH2 | " | " |
| 3-C6H5 | " | —CH2CH2CH2SO2CH3 | " | " |
| " | " | —CH2CH2SCH3 | " | " |
| " | H | —CH2CH2N(COCH2\COCH2) | —CH2CH2CH2— | Na+ |
| " | " | —CH2CH2CH2N(CO—CH2\CH2CH2) | " | " |
| " | 3-OC6H5 | —CH2CH2N(CO\CO)-benzo | " | NH4+ |
| " | 3-CH3 | —C6H5 | " | Na+ |
| " | " | " | —CH2CH(CH2OC6H5)— | " |
| " | " | —CH2-furyl | " | " |
| 3-SO2CH3 | " | —CH2CH2COOCH3 | —CH2CH(C6H5)— | " |
| 3-SCH2CH2COOCH3 | " | —CH2CH2CN | —CH2CH(CH3)— | " |
| 3-SCH2C6H5 | " | —C2H5 | —CH2CH(OH)CH2— | " |
| 3-SCH2CH2OCH3 | 2-CH3S | H | —CH2CH2CH2CH2— | " |
| 3-SC6H11 | 3-CH3 | —C2H4OC2H4OC2H5 | —CH2CH(OCOCH3)CH2— | " |
| 3-SC2H5 | " | —CH2CH(OH)CH2Cl | —CH2CH2— | " |
| " | 2-OCH3, 5-CH3 | C2H5 | " | " |
| " | " | H | —CH2CH2OCH2CH2— | " |
| " | " | H | " | " |
| " | " | " | —CH2CH2SO2CH2CH2— | K+ |
| 3-SCH2COOCH3 | 3-CH3 | C2H5 | —CH2CH2SCH2CH2— | " |
| " | " | " | —CH2CH2N(SO2CH3)CH2CH2— | " |
| " | " | " | —CH2CH2NHSO2CH2CH2CH2CH2— | " |
| " | " | " | —CH2CH2SO2NHCH2CH2— | " |
| 3-SCH3 | " | " | —CH2CH2N(COCH3)CH2CH2— | " |
| " | " | " | —CH2CH2CONHC2H4— | " |
| " | " | " | —CH2CH2NHCOCH2— | " |
| 3-SCH2CH(CH3)2 | " | " | —CH2CH2N(SO2C6H5)CH2CH2— | " |
| " | " | " | —CH2CH2SO2N(CH3)CH2CH2— | " |
| " | " | " | —CH2CH2SO2N(C6H5)CH2CH2— | " |
| " | " | " | —CH2CH2N(SO2C6H11)CH2CH2— | " |
| " | " | " | —CH2CH2N(COCH3)CH2CH2— | " |
| " | " | " | —CH2CH(CH2OCH3)— | " |
| " | " | " | —CH2CH(Cl)CH2— | " |
| " | " | " | —CH2CH2NHCONHC2H4— | " |
| " | " | " | —CH2CH2NHCOOCH2CH2— | " |
| " | " | " | —CH2CH2COOCH2CH2— | " |

TABLE 5

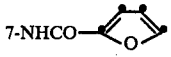

| R | (R₁)m | R₃ | R₄ | Z | M |
|---|---|---|---|---|---|
| 3-CH₃ | H | CH₃ | CH₃ | —CH₂CH₂— | K⁺ |
| " | 7-CH₃ | " | " | " | " |
| " | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| " | 8-OC₂H₅ | H | H | " | " |
| 3-SCH₃ | 7-CH₃ | " | " | " | " |
| 3-C₆H₅ | 7-NHCOCH₃ | CH₃ | CH₃ | " | Na⁺ |
| " | 7-NHCOH | " | " | " | " |
| " | 7-NHCOCH₂OCH₃ | " | " | " | " |
| " | 7-NHCOCH₂OC₆H₅ | H | CH(CH₃)₂ | " | " |
| " | 7-NHCOCH₂C₆H₅ | " | " | " | " |
| " | 7-NHCOCH₂Cl | " | " | " | " |
| " | 7-NHCOC₆H₅ | " | " | " | " |
| " | 7-NHCOC₆H₁₁ | CH₃ | CH₃ | " | " |
| " | 7-NHCONHC₂H₅ | " | " | " | " |
| " | 7-NHSO₂CH₃ | " | " | " | " |
| " | 7-NHCOCH₂CN | " | " | " | " |
| C₆H₄—o-CN | 7-NHCOCH₂OH | " | " | " | " |
| " | 7-NHCOOC₂H₅ | " | " | —CH₂CH₂CH₂— | " |
| " | 7-NHCOCH₂CH₂OCCH₃ (O=) | " | " | " | " |
| " | 8-OC₄H₉—n | H | CH₃ | —CH₂CH₂— | " |
| 3-C₆H₄—p-CH₃ | 7-CH₃ | CH₃ | H | " | " |
| 3-C₆H₄—o-Cl | 7-NHCO-(furyl) | " | CH₃ | " | " |
| 3-SO₂CH₃ | 7-OC₂H₅ | " | " | " | " |
| 3-SC₆H₁₁ | 7-OC₄H₉—n | " | " | " | " |
| 3-SCH₂CH₂OCH₃ | 7-CH₃ | " | H | " | " |
| 3-SCH₂CH₂COOCH₃ | " | " | " | " | " |
| 3-SCH₂C₆H₅ | " | " | " | —CH₂CH₂CH₂CH₂— | " |
| 3-CH₂CH₃ | " | " | " | —CH₂CH₂— | " |
| 3-SCH₂COOCH₃ | " | " | " | " | " |
| 3-SCH₂CH₂COOC₂H₅ | " | " | " | " | " |
| 3-SCH₂CH₂COOCH(CH₃)₂ | " | " | " | —CH₂CH₂SO₂CH₂CH₂— | K⁺ |
| 3-SO₂C₄H₉—n | " | " | " | —CH₂CH₂OCH₂CH₂— | " |
| 3-SCH₂CH₂CONHC₄H₉—n | " | " | " | —CH₂CH₂SCH₂CH₂— | " |
| 3-SCH₃ | " | " | " | —CH₂CH(C₆H₅)— | " |
| " | " | " | " | —CH₂CH(CH₃)— | " |
| 3-SC₂H₅ | " | " | " | —CH₂CH(OH)CH₂— | " |
| " | " | " | " | —CH₂CH(Cl)CH₂— | " |
| " | " | " | " | —CH₂CH(CH₂OCH₂CH₃)— | " |
| " | " | " | " | —CH₂CH(CH₂OC₆H₅)— | " |
| " | " | " | " | —CH₂CH₂N(SO₂CH₃)CH₂CH₂— | " |
| " | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| " | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| " | " | " | " | —CH₂CH₂SO₂N(C₆H₅)CH₂CH₂— | " |
| " | " | " | " | —CH₂CH₂SO₂N(CH₃)CH₂CH₂— | " |

TABLE 6

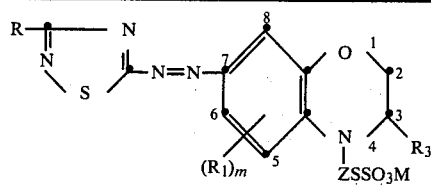

| R | (R₁)m | R₃ | Z | M |
|---|---|---|---|---|
| 3-$CH_3$ | 6-$CH_3$ | H | —$CH_2CH_2$— | $K^+$ |
| " | H | H | " | " |
| " | " | $CH_3$ | " | " |
| " | 6-$CH_3$ | " | " | " |
| H | " | " | —$CH_2CH_2CH_2CH_2$— | " |
| " | 6-$OCH_3$ | " | " | " |
| 3-$SCH_3$ | " | " | —$CH_2CH_2$— | " |
| 3-$CH_2CH_3$ | 6-$CH_3$ | " | " | " |
| 3-$SCH_2CH_2OCH_3$ | " | " | —$CH_2CH_2OCH_2CH_2$— | " |
| 3-$SCH_2CH_2OC_2H_5$ | " | " | —$CH_2CH_2SO_2CH_2CH_2$— | " |
| 3-$SCH_2CH_2COOCH_3$ | " | " | —$CH_2CH_2SCH_2CH_2$— | " |
| 3-$SCH_2COOCH_2CH_3$ | " | " | —$CH_2CH(CH_3)$— | " |
| 3-$SCH_2C_6H_5$ | 6-$OC_2H_5$ | " | —$CH_2CH(C_6H_5)$— | " |
| 3-$SC_6H_{11}$ | 6-$NHCOCH_3$ | " | —$CH_2CH_2$— | " |
| 3-$SCH_3$ | 6-$NHCOH$ | " | " | $Na^+$ |
| " | 6-$NHCOCH_2CH_2OCH_3$ | " | " | " |
| " | 6-$NHCOCH_2Cl$ | " | " | " |
| " | 6-$NHCOCH_2CN$ | " | " | " |
| " | 6-$NHCOCH_2CONH_2$ | " | " | " |
| " | 6-$NHCOCH_2OC_6H_5$ | " | " | " |
| 3-$SO_2CH_3$ | 6-$NHCOOC_2H_5$ | " | " | " |
| 3-$SO_2C_4H_9$—n | 6-$NHCONHC_2H_5$ | " | " | " |
| 3-$C_6H_5$ | 6-$NHCOC_6H_5$ | " | " | " |
| 3-$C_6H_4$—o-CN | 6-$NHCOC_6H_{11}$ | " | " | " |
| 3-$C_6H_4$—o-Cl | 6-$NHSO_2CH_3$ | " | " | " |
| 3-$C_6H_4$—p-$CH_3$ | 6-$NHCOCH_2CH_2OCOCH_3$ | " | " | " |
| 3-$C_6H_4$—m-$CH_3$ | 6-NHCO-furyl | " | " | " |
| 3-$C_6H_4$—o-$CH_3$ | 6-$NHCOCH_2CH_2CH_2OH$ | " | " | " |
| 3-$C_6H_4$—o-$CONH_2$ | 6-$CH_3$ | " | —$CH_2CH_2CH_2$— | " |
| 3-$C_6H_4$—o-CN | " | " | —$CH_2CH_2$— | " |
| 3-S—$CH_2CH_2OC_6H_5$ | " | " | " | " |
| 3-$SO_2C_4H_9$—n | " | " | " | " |
| 3-$SO_2CH_2CH_2COOCH_3$ | " | " | " | " |
| 3-$SO_2CH_2COOCH_3$ | " | " | " | " |
| 3-$SO_2C_6H_{11}$ | " | " | " | " |
| 3-$SO_2CH_2CH_3$ | " | " | " | " |
| 3-$SO_2CH_2CH_2OCH_3$ | " | H | —$CH_2CH(CH_3)$— | " |
| 3-$SCH_2CH_2CONHC_2H_4OH$ | " | $CH_3$ | —$CH_2CH_2N(SO_2CH_3)CH_2CH_2$— | $K^+$ |
| 3-$SCH_2CH_3$ | " | " | —$CH_2CH_2SO_2NHCH_2CH_2$— | " |
| " | " | " | —$CH_2CH_2SO_2N(CH_3)CH_2CH_2CH_2$— | " |
| " | " | " | —$CH_2CH_2SO_2N(C_6H_5)CH_2CH_2$— | " |
| " | " | " | —$CH_2CH_2SO_2N(C_6H_{11})CH_2CH_2$— | " |
| " | " | " | —$CH_2CH_2CH_2CH_2N(SO_2CH_3)CH_2CH_2$— | " |
| " | " | " | —$CH_2CH_2N(SO_2C_6H_4$—p-$CH_3)$—$CH_2CH_2$— | " |
| " | " | " | —$CH_2CH_2N(SO_2C_6H_{11})CH_2CH_2$— | " |
| 3-$C_6H_5$ | " | " | —$CH_2CH(Cl)CH_2$— | " |
| " | " | " | —$CH_2CH(OH)CH_2$— | " |
| " | " | " | —$CH_2CH(CH_2OCH_3)$— | " |
| " | " | " | —$CH_2CH(CH_2OC_6H_5)$— | " |
| " | " | " | —$CH_2CH(OCOCH_3)CH_2$— | " |
| " | " | " | —$CH_2CH_2NHCOCH_2$— | " |
| " | " | " | —$CH_2CH_2CONHC_2H_4$— | " |
| " | " | " | —$CH_2CH_2NHCOOCH_2CH_2$— | " |
| " | " | " | —$CH_2CH_2COOCH_2CH_2$— | " |
| " | " | " | —$CH_2CH_2NHCONHCH_2CH_2$— | " |
| " | " | " | —$CH_2CH_2N(COCH_3)CH_2CH_2$— | " |
| " | " | " | —$CH_2CH_2N(COC_6H_5)CH_2CH_2$— | " |

TABLE 7

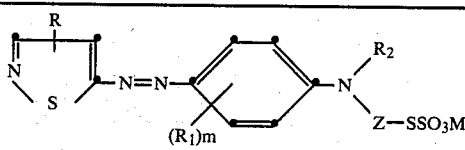

| R | (R₁)m | R₂ | Z | M |
|---|---|---|---|---|
| 3-$CH_3$, 4-Br | 2-$CH_3$ | H | —$CH_2CH_2$— | $K^+$ |

TABLE 7-continued

| R | (R₁)m | R₂ | Z | M |
|---|---|---|---|---|
| " | " | " | —CH₂CH₂COOCH₂CH₂— | " |

TABLE 8

| R | (R₁)m | R₃ | R₄ | Z | M |
|---|---|---|---|---|---|
| 3-CH₃—4-Br | H | CH₃ | CH₃ | —CH₂CH₂— | K⁺ |
| " | 7-CH₃ | " | " | " | " |
| " | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| " | 8-OC₂H₅ | H | H | " | " |
| " | 7-CH₃ | " | " | " | " |
| 3-CH₃—4-CN | 7-NHCOCH₃ | CH₃ | CH₃ | " | Na⁺ |
| " | 7-NHCOH | " | " | " | " |
| " | 7-NHCOCH₂OCH₃ | " | " | " | " |
| 3-CH₃—4-COOC₂H₅ | 7-NHCOCH₂OC₆H₅ | H | CH(CH₃)₂ | " | " |
| " | 7-NHCOCH₂C₆H₅ | " | " | " | " |
| " | 7-NHCOCH₂Cl | " | " | " | " |
| 3-CH₃ | 7-NHCOC₆H₅ | " | " | " | " |
| " | 7-NHCOC₆H₁₁ | CH₃ | CH₃ | " | " |
| 3-CH₃—4-Cl | 7-NHCONHC₂H₅ | " | " | " | " |
| " | 7-NHCOCH₂CN | " | " | " | " |
| " | 7-NHCOCH₂OH | " | " | " | " |
| 3-Cl-4-CN | 7-NHCOOC₂H₅ | " | " | —CH₂CH₂CH₂— | " |
| 3-Br-4-COOCH₃ | 7-NHCHCH₂CH₂OCCH₃ (O=) | " | " | " | " |
| 3—4-SCH₂CH₂OCOCH₃ | " | " | " | —CH₂CH₂CH₂CH₂— | " |
| 3-CH₃—4-SCH₃ | " | " | " | —CH₂CH₂— | " |
| 3-CH₃—4-SO₂CH₃ | " | " | " | " | " |
| 3-CH₃—4-SC₆H₅ | " | " | " | " | " |
| 3-CH₃—4-SC₆H₄—p-C(CH₃)₃ | " | " | " | —CH₂CH₂SO₂CH₂CH₂— | K⁺ |
| 3-CH₂—4-SC₆H₄—p-Cl | " | " | " | —CH₂CH₂OCH₂CH₂— | " |
| " | " | " | " | —CH₂CH₂SCH₂CH₂— | " |
| 3-CH₃—4-S—(benzothiazolyl) | " | " | " | | " |
| 3-CH₃—4-S—(benzoxazolyl) | " | " | " | —CH₂CH(C₆H₅)— | " |
| 3-CH₃—4-S—(triazolyl) | " | " | " | —CH₂CH(CH₃)— | " |
| 3-CH₃—4-SC₆H₁₁ | " | " | " | —CH₂CH(OH)CH₂— | " |
| 3-CH₃—4-SCN | " | " | " | —CH₂CH(Cl)CH₂— | " |
| 3-CH₃—4-OC₆H₅ | " | " | " | —CH₂CH(CH₂OCH₂CH₃)— | " |
| 3-CH₃—4-OC₂H₅ | " | " | " | —CH₂CH(CH₂OC₆H₅)— | " |
| 3-CH₃—4-SCH₂CH=CH₂ | " | " | " | —CH₂CH₂N(SO₂CH₃)CH₂CH₂— | " |
| 3-CH₃—4-Br | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |

TABLE 7-continued

[Structure: thiazole-R connected via C=N–N=N to phenyl-(R₁)m with N(R₂)(Z-SSO₃M) substituent]

| R | (R₁)m | R₂ | Z | M |
|---|---|---|---|---|
| " | 2-Cl | " | " | " |
| " | 2,5-di-Cl | " | " | " |
| " | 2,5-di-CH₃ | " | " | " |
| " | 2,5-di-OCH₃ | " | " | " |
| " | 3-OCH₃ | —C₂H₅ | " | " |
| " | 2-OCH₃, 5-NHCOCH₃ | H | " | " |
| " | 2-CH₃, 3-Cl | " | " | " |
| " | 2-OCH₃, 5-Cl | " | " | " |
| " | 3-NHCOCH₃ | —C₂H₅ | " | " |
| " | 3-NHCOC₂H₅ | —C₂H₄OCH₃ | " | " |
| " | 3-NHCOCH₂OH | —CH₂C₆H₅ | " | " |
| H | 3-NHCOCH₂OCH₃ | —C₆H₁₁ | " | " |
| " | 3-NHCOC₆H₅ | —CH₂C₆H₁₁ | " | " |
| " | 3-NHCOOC₂H₅ | —CH₂CH₂OC₆H₅ | " | " |
| 3-CH₃—4-Cl | 3-NHCONHC₂H₅ | —CH₂CH₂OH | " | " |
| " | 3-NHCOC₆H₁₁ | —CH₂CH(CH₃)₂ | " | " |
| " | 3-NHCOCH₂CN | —CH₂CH₂CH₂CH₃ | " | " |
| " | 3-NHCOCH₂OC₆H₅ | —CH₂CH₂OCOCH₃ | " | " |
| 3-CH₃—4-CN | 3-NHCOCH₂C₆H₅ | —CH₂CH₂CONH₂ | " | " |
| 3-CH₃—4-COOC₂H₅ | 3-CH₃ | —CH₂CH₂NHCOCH₃ | " | " |
| " | " | —CH₂CH₂NHSO₂CH₃ | " | " |
| " | " | —CH₂CH₂SO₂NH₂ | " | " |
| " | " | —CH₂CH₂CH₂SO₂CH₃ | " | " |
| 3-CH₃—4-SCH₂CH=CH₂ | " | —CH₂CH₂SCH₃ | " | " |
| " | H | —CH₂CH₂N(COCH₂–)(COCH₂–) (succinimide) | —CH₂CH₂CH₂— | Na⁺ |
| " | " | —CH₂CH₂CH₂N(CO—CH₂)(CH₂CH₂) (glutarimide-type) | " | " |
| 3-CH₃—4-SO₂C₂H₅ | 3-OC₆H₅ | —CH₂CH₂N(CO)(CO)-phthalimide | " | NH₄⁺ |
| 3-CH₃—4-SC₆H₁₁ | 3-CH₃ | —C₆H₅ | —CH₂CH₂— | Na⁺ |
| 3-CH₃—4-OC₂H₅ | " | —CH₂-(furan) | —CH₂CH(CH₂OC₆H₅)— | " |
| 3-Cl—4-CN | " | —CH₂CH₂COOCH₃ | —CH₂CH(C₆H₅)— | " |
| 3-CH₃—4-SCN | " | —CH₂CH₂CN | —CH₂CH(CH₃)— | " |
| 3-Br—4-COOCH₃ | " | —C₂H₅ | —CH₂CH(OH)CH₂— | " |
| 3-CH₃—4-COOC₂H₅ | 2-CH₃S | H | —CH₂CH₂CH₂CH₂— | " |
| 3-CH₃—4-CONH₂ | 3-CH₃ | —C₂H₄OC₂H₄OC₂H₅ | —CH₂CH(OCOCH₃)CH₂— | " |
| 3-CH₃—4-CONHC₂H₄OH | " | —CH₂CH(OH)CH₂Cl | —CH₂CH₂— | " |
| 3-CH₃—4-CONHC₄H₉-n | 2-OCH₃, 5-CH₃ | C₂H₅ | " | " |
| 3-CH₃—4-OC₆H₅ | " | H | —CH₂CH₂OCH₂CH₂— | " |
| 3-CH₃—4-OC₆H₄—p-CH₃ | " | H | " | " |
| 3-CH₃—4-SC₆H₅ | " | " | —CH₂CH₂SCH₂CH₂— | K⁺ |
| 3-CH₃—4-SCH₂OH | 3-CH₃ | C₂H₅ | —CH₂CH₂SCH₂CH₂— | " |
| 3-CH₃—4-SCH₂CH₃ | " | " | —CH₂CH₂N(SO₂CH₃)CH₂CH₂— | " |
| " | " | " | —CH₂CH₂NHSO₂CH₂CH₂CH₂CH₂— | " |
| 3—CH₃—4-S—C(=N)(benzothiazole) | | | | |
| 3-CH₃—4-Br | " | " | —CH₂CH₂SO₂NHCH₂CH₂— | " |
| " | " | " | —CH₂CH₂N(COCH₃)CH₂CH₂— | " |
| " | " | " | —CH₂CH₂CONHC₂H₄— | " |
| " | " | " | —CH₂CH₂NHCOCH₂— | " |
| " | " | " | —CH₂CH₂SO₂N(C₆H₅)CH₂CH₂— | " |
| 3-CH₃—4-CONH₂ | " | " | —CH₂CH₂SO₂N(CH₃)CH₂CH₂— | " |
| 3-CH₃—4-CONHC₃H₆OCH₃ | " | " | —CH₂CH₂SO₂N(C₆H₅)CH₂CH₂— | " |
| 3-CH₃—4-Cl | " | " | —CH₂CH₂N(SO₂C₆H₁₁)CH₂CH₂— | " |
| " | " | " | —CH₂CH₂N(COCH₃)CH₂CH₂— | " |
| " | " | " | —CH₂CH(CH₂OCH₃)— | " |
| " | " | " | —CH₂CH(Cl)CH₂— | " |
| " | " | " | —CH₂CH₂NHCONHC₂H₄— | " |
| " | " | " | —CH₂CH₂NHCOOCH₂CH₂— | " |

TABLE 8-continued

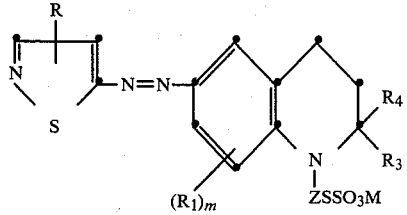

| R | (R₁)ₘ | R₃ | R₄ | Z | M |
|---|---|---|---|---|---|
| " | " | " | " | —CH$_2$CH$_2$CONHC$_2$H$_4$— | " |
| " | " | " | " | —CH$_2$CH$_2$NHCONHC$_2$H$_4$— | " |
| " | " | " | " | —CH$_2$CH$_2$N(SO$_2$C$_6$H$_5$)CH$_2$CH$_2$— | " |
| " | " | " | " | —CH$_2$CH$_2$N(COCH$_3$)CH$_2$CH$_2$— | " |
| " | " | " | " | —CH$_2$CH$_2$SO$_2$N(C$_6$H$_5$)CH$_2$CH$_2$— | " |
| " | " | " | " | —CH$_2$CH$_2$SO$_2$N(CH$_3$)CH$_2$CH$_2$— | " |

TABLE 9

| R | (R₁)m | R₃ | Z | M |
|---|---|---|---|---|
| 3-CH$_3$—4-Cl | 6-CH$_3$ | H | —CH$_2$CH$_2$— | K$^+$ |
| " | H | H | " | " |
| " | " | CH$_3$ | " | " |
| " | 6-CH$_3$ | " | " | " |
| 3-Cl—4-CN | " | " | —CH$_2$CH$_2$CH$_2$CH$_2$— | " |
| " | 6-OCH$_3$ | " | " | " |
| 3-CH$_3$ | " | " | —CH$_2$CH$_2$— | " |
| 3-CH$_3$—4-COOC$_2$H$_5$ | 6-CH$_3$ | " | —CH$_2$CH$_2$OCH$_2$CH$_2$— | " |
| 3-CH$_3$—4-CONH$_2$ | " | " | —CH$_2$CH$_2$SO$_2$CH$_2$CH$_2$— | " |
| 3-CH$_3$—4-CONHC$_2$H$_4$OH | " | " | —CH$_2$CH$_2$SCH$_2$CH$_2$— | " |
| 3-CH$_3$—4-CONHC$_4$H$_9$—n | " | " | —CH$_2$CH(CH$_3$) | " |
| 3-CH$_3$—4-CONHC$_3$H$_6$OCH$_3$ | " | " | —CH$_2$CH(C$_6$H$_5$)— | " |
| 3-CH$_3$—4-CO$_2$CH$_2$H$_2$OCH$_3$ | 6-OC$_2$H$_5$ | " | —CH$_2$CH$_2$— | " |
| 3-CH$_3$—4-CONHCH$_3$ | 6-NHCOCH$_3$ | " | " | " |
| 3-CH$_3$—4-Br | 6-NHCOH | " | " | Na$^+$ |
| " | 6-NHCOCH$_2$CH$_2$OCH$_3$ | " | " | " |
| " | 6-NHCOCH$_3$Cl | " | " | " |
| " | 6-NHCOCH$_2$CN | " | " | " |
| H | 6-NHCOCH$_2$CONH$_2$ | " | " | " |
| " | 6-NHCOCH$_2$OC$_6$H$_5$ | " | " | " |
| 3-CH$_3$—4-SC$_2$H$_5$ | 6-NHCOOC$_2$H$_5$ | " | " | " |
| 3-CH$_3$—4-SCH$_2$CH$_2$OH | 6-NHCONHC$_2$H$_5$ | " | " | " |
| 3-CH$_3$—4-SCH$_2$CH=CH$_2$ | 6-NHCOC$_6$H$_5$ | " | " | " |
| 3-CH$_3$—4-SCH$_2$OCOCH$_3$ | 6-NHCOC$_6$H$_{11}$ | " | " | " |
| 3-CH$_3$—4-S—C$_6$H$_5$ | 6-NHSO$_2$CH$_3$ | " | " | " |
| 3-CH$_3$—4-S—C$_6$H$_4$—p-C(CH$_3$)$_2$ | 6-NHCOCH$_2$CH$_2$OCOCH$_3$ | " | " | " |
| 3-CH$_3$—4-S—C$_6$H$_{11}$ | | | | |
| | 6-NHCO—(furan) | " | " | " |
| 3-CH$_3$—4-SO$_2$CH$_2$CH$_2$OH | 6-NHCOCH$_2$CH$_2$OH | " | " | " |
| 3-CH$_3$—4-SO$_2$CH$_2$CH$_3$ | 6-CH$_3$ | " | —CH$_2$CH$_2$CH$_2$— | " |
| 3-CH$_3$—4-OC$_6$H$_5$ | " | " | —CH$_2$CH$_2$— | " |
| 3-CH$_3$—4-OC$_6$H$_4$—p-OCH$_3$ | " | " | " | " |
| 3-CH$_3$—4-S—(benzothiazolyl) | " | " | " | " |
| 3-CH$_3$—4-S—(thiadiazolyl-NHCOCH$_3$) | " | " | " | " |

TABLE 9-continued

Structure: thiazole ring with R substituent connected via -N=N- to benzene ring with (R₁)m substituent and -N(R₃)(Z-SSO₃M) group, with O attached.

| R | (R₁)m | R₃ | Z | M |
|---|---|---|---|---|
| 3-CH₃—4-S—C(=N—NH—CH=N) (triazole) | " | " | " | " |
| 3-CH₃—4-SCH₂CH(OH)CH₂OH | " | " | " | " |
| 3-CH₃—4-SCH₂COOCH₃ | " | " | " | " |
| 3-CH₃—4-OC₂H₅ | " | H | —CH₂CH(CH₃)— | " |
| 3-CH₃—4-Br | " | CH₃ | —CH₂CH₂N(SO₂CH₃)CH₂CH₂— | K⁺ |
| " | " | " | —CH₂CH₂SO₂NHCH₂CH₂— | " |
| " | " | " | —CH₂CH₂SO₂N(CH₃)CH₂CH₂CH₂— | " |
| " | " | " | —CH₂CH₂SO₂N(C₆H₅)CH₂CH₂— | " |
| " | " | " | —CH₂CH₂SO₂N(C₆H₁₁)CH₂CH₂— | " |
| " | " | " | —CH₂CH₂CH₂CH₂N(SO₂CH₃)CH₂CH₂— | " |
| " | " | " | —CH₂CH₂N(SO₂C₆H₄—p-CH₃)—CH₂CH₂— | " |
| " | " | " | —CH₂CH₂N(SO₂C₆H₁₁)CH₂CH₂— | " |
| " | " | " | —CH₂CH(Cl)CH₂— | " |
| " | " | " | —CH₂CH(OH)CH₂— | " |
| " | " | " | —CH₂CH(CH₂OCH₃)— | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂— | " |
| " | " | " | —CH₂CH₂N(COCH₃)CH₂CH₂— | " |
| " | " | " | —CH₂CH₂N(COC₆H₅)CH₂CH₂— | " |

TABLE 10

Structure: pyrazole ring with R and A substituents, connected via —N=N— to benzene ring with (R₁)m substituent and —N(R₂)(Z—SSO₃M) group.

| A | R | (R₁)m | R₂ | Z | M |
|---|---|---|---|---|---|
| H | 4-CN | 2-CH₃ | H | —CH₂CH₂— | K⁺ |
| " | " | 2-Cl | " | " | " |
| " | " | 2,5-di-Cl | " | " | " |
| " | " | 2,5-di-CH₃ | " | " | " |
| " | " | 2,5-di-OCH₃ | " | " | " |
| " | " | 3-OCH₃ | —C₂H₅ | " | " |
| " | " | 2-OCH₃, 5-NHCOCH₃ | H | " | " |
| " | " | 2-CH₃, 3-Cl | " | " | " |
| " | " | 2-OCH₃, 5-Cl | " | " | " |
| " | " | 3-NHCOCH₃ | —C₂H₅ | " | " |
| " | " | 3-NHCOC₂H₅ | —C₂H₄OCH₃ | " | " |
| " | H | 3-NHCOCH₂OH | —CH₂C₆H₅ | " | " |
| " | " | 3-NHCOCH₂OCH₃ | —C₆H₁₁ | " | " |
| " | " | 3-NHCOC₆H₅ | —CH₂C₆H₁₁ | " | " |
| " | " | 3-NHCOOC₂H₅ | —CH₂CH₂OC₆H₅ | " | " |
| " | " | 3-NHCONHC₂H₅ | —CH₂CH₂OH | " | " |
| C₆H₅ | 3-SC₂H₅—4-CN | 3-NHCOC₆H₁₁ | —CH₂CH(CH₃)₂ | " | " |
| " | 3-SC₂H₅—4-COOCH₃ | 3-NHCOCH₂CN | —CH₂CH₂CH₂CH₃ | " | " |
| " | 3-SC₂H₅—4-CONH₂ | 3-NHCOCH₂OC₆H₅ | —CH₂CH₂OCOCH₃ | " | " |
| " | 3-SCH₃—4-CN | 3-NHCOCH₂C₆H₅ | —CH₂CH₂CONH₂ | " | " |
| " | " | 3-CH₃ | —CH₂CH₂NHCOCH₃ | " | " |
| " | " | " | —CH₂CH₂NHSO₂CH₃ | " | " |
| SO₂C₆H₅ | " | " | —CH₂CH₂SO₂NH₂ | " | " |
| COCH₃ | 4-CN | " | —CH₂CH₂cH₂SO₂CH₃ | " | " |
| H | " | H | —CH₂CH₂SCH₃ | " | " |
| | | | —CH₂CH₂N(COCH₂)(COCH₂) (morpholine-dione) | —CH₂CH₂CH₂— | Na⁺ |

TABLE 10-continued

Structure: pyrazole-N=N-phenyl-N(R2)(Z-SSO3M) with R on pyrazole, A on ring N, (R1)m on phenyl

| A | R | (R1)m | R2 | Z | M |
|---|---|---|---|---|---|
| " | " | " | —CH₂CH₂CH₂N(CO—CH₂—CH₂CH₂) (succinimido) | " | " |
| " | " | 3-OC₆H₅ | —CH₂CH₂N(CO-C₆H₄-CO) (phthalimido) | " | NH₄⁺ |
| COOC₂H₅ | " | 3-CH₃ | —C₆H₅ | —CH₂CH₂— | Na⁺ |
| H | " | " | —CH₂-furyl | —CH₂CH(CH₂OC₆H₅)— | " |
| CH₃ | 4-CN | " | —CH₂CH₂COOCH₃ | —CH₂CH(C₆H₅)— | " |
| " | 4-COOCH₃ | " | —CH₂CH₂CN | —CH₂CH(CH₃)— | " |
| " | 4-CONH₂ | " | —C₂H₅ | —CH₂CH(OH)CH₂— | " |
| —CH₂CH₃ | 4-CN | 2-CH₃S | H | —CH₂CH₂CH₂— | " |
| C₆H₅ | " | 3-CH₃ | —C₂H₄OC₂H₄OC₂H₅ | —CH₂CH(OCOCH₃)CH₂— | " |
| " | 4-COOCH₃ | " | —CH₂CH(OH)CH₂Cl | —CH₂CH₂— | " |
| C₆H₄—p-Cl | " | 2-OCH₃, 5-CH₃ | C₂H₅ | " | " |
| C₆H₄—o-CH₃ | " | " | H | —CH₂CH₂OCH₂CH₂— | " |
| C₆H₅ | " | " | H | " | " |
| H | 4-CONHC₂H₄OH | 3-CH₃ | C₂H₅ | —CH₂CH₂SO₂CH₂CH₂— | K⁺ |
| " | 4-CONHC₄H₉—n | " | " | —CH₂CH₂SCH₂CH₂— | " |
| " | 4-CONHC₄H₉—n | " | " | —CH₂CH₂N(SO₂CH₃)CH₂CH₂— | " |
| " | 4-COOC₂H₄OCH₃ | " | " | —CH₂CH₂N(SO₂CH₃)CH₂CH₂— | " |
| " | 4-CONHC₃H₆OCH₃ | " | " | —CH₂CH₂NHSO₂CH₂CH₂CH₂CH₂— | " |
| " | 4-CN | " | " | —CH₂CH₂SO₂NHCH₂CH₂— | " |
| " | " | " | " | —CH₂CH₂N)COCH₂)CH₂CH₂— | " |
| " | " | " | " | —CH₂CH₂CONHC₂H₄— | " |
| " | " | " | " | —CH₂CH₂NHCOCH₂— | " |
| SO₂CH₃ | 4-CN | " | " | —CH₂CCH₂N(SO₂C₆H₅)CH₂CH₂— | " |
| SO₂C₆H₅ | " | " | " | —CH₂CH₂SO₂N(CH₃)CH₂CH₂— | " |
| SO₂CH₂CH₃ | " | " | " | —CH₂CH₂SO₂N(C₆H₅)CH₂CH₂— | " |
| H | " | " | " | —CH₂CH₂N(SO₂C₆H₁₁)CH₂CH₂— | " |
| " | " | " | " | —CH₂CH₂N(COCH₃)CH₂CH₂— | " |
| " | " | " | " | —CH₂CH(CH₂OCH₃)— | " |
| " | " | " | " | —CH₂CH(Cl)CH₂— | " |
| " | " | " | " | —CH₂CH₂NHCONHC₂H₄— | " |
| " | " | " | " | —CH₂CH₂NHCOOCH₂CH₂— | " |
| " | " | " | " | —CH₂CH₂COOCH₂CH₂— | " |

TABLE 11

Structure: pyrazole-N=N-phenyl fused with tetrahydroquinoline bearing R3, R4 substituents, N-Z-SSO3M

| A | R | (R1)m | R3 | R4 | Z | M |
|---|---|---|---|---|---|---|
| H | 4-CN | H | CH₃ | CH₃ | —CH₂CH₂— | K⁺ |
| " | " | 7-CH₃ | " | " | " | " |
| " | " | 7-OCH₃ | " | " | " | " |
| " | " | 7-Cl | " | " | " | " |
| " | " | 5-CH₃, 8-OCH₃ | " | " | " | " |
| " | " | 5,8-di-OCH₃ | " | " | " | " |
| " | " | 5,8-di-CH₃ | " | " | " | " |
| " | " | 5-Cl, 8-OCH₃ | " | " | " | " |
| " | " | 8-OCH₃ | " | " | " | " |
| " | " | 8-OC₂H₅ | H | H | " | " |
| " | H | 7-CH₃ | " | " | " | " |
| CH₃ | " | 7-NHCOCH₃ | CH₃ | CH₃ | " | Na⁺ |
| " | " | 7-NHCOH | " | " | " | " |
| H | 4-COOCH₃ | 7-NHCOCH₂OCH₃ | " | " | " | " |
| H | 4-COOC₂H₅ | 7-NHCOCH₂OC₆H₅ | H | CH(CH₃)₂ | " | " |

TABLE 11-continued

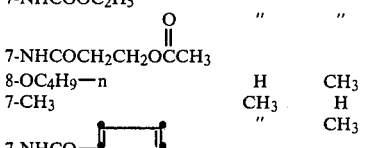

| A | R | $(R_1)_m$ | $R_3$ | $R_4$ | Z | M |
|---|---|---|---|---|---|---|
| H | 4-COOC$_2$H$_4$OCH$_3$ | 7-NHCOCH$_2$C$_6$H$_5$ | " | " | " | " |
| H | 4-CONH$_2$ | 7-NHCOCH$_2$Cl | " | " | " | " |
| H | 4-CONHC$_2$H$_5$ | 7-NHCOC$_6$H$_5$ | " | " | " | " |
| " | " | 7-NHCOC$_6$H$_{11}$ | CH$_3$ | CH$_3$ | " | " |
| " | " | 7-NHCONHC$_2$H$_5$ | " | " | " | " |
| C$_6$H$_5$ | 4-CN | 7-NHSO$_2$CH$_3$ | " | " | " | " |
| " | " | 7-NHCOCH$_2$CN | " | " | " | " |
| C$_6$H$_4$—p-Cl | " | 7-NHCOCH$_2$OH | " | " | " | " |
| C$_6$H$_4$—p-CH$_3$ | " | 7-NHCOOC$_2$H$_5$ | " | " | —CH$_2$CH$_2$CH$_2$— | " |
| SO$_2$CH$_3$ | " | 7-NHCOCH$_2$CH$_2$OCOCH$_3$ | " | " | " | " |
| " | 4-COOCH$_3$ | 8-OC$_4$H$_9$—n | H | CH$_3$ | —CH$_2$CH$_2$— | " |
| SO$_2$C$_6$H$_5$ | " | 7-CH$_3$ | CH$_3$ | H | " | " |
| " | 4-CN | 7-NHCO-furyl | " | CH$_3$ | " | " |
| " | 4-CONHC$_2$H$_4$OH | 7-OC$_2$H$_5$ | " | " | " | " |
| " | 4-COOCH(CH$_3$)$_2$ | 7-OC$_4$H$_9$—n | " | " | " | " |
| CH$_3$ | 3-SC$_2$H$_5$—4-CN | 7-CH$_3$ | " | H | " | " |
| C$_6$H$_5$ | " | " | " | " | " | " |
| " | 3-SC$_2$H$_5$—4-COOCH$_3$ | " | " | " | —CH$_2$CH$_2$CH$_2$CH$_2$— | " |
| " | 3-SCH$_3$—4-COOC$_2$H$_5$ | " | " | " | —CH$_2$CH$_2$— | " |
| " | 3-SO$_2$CH$_3$—4-COOCH$_3$ | " | " | " | " | " |
| " | 3-SC$_6$H$_5$—4-COOCH$_3$ | " | " | " | " | " |
| COCH$_3$ | 4-CN | " | " | " | —CH$_2$CH$_2$SO$_2$CH$_2$CH$_2$— | K$^+$ |
| " | 4-COOCH$_3$ | " | " | " | —CH$_2$CH$_2$OCH$_2$CH$_2$— | " |
| CH$_2$CH$_2$OH | " | " | " | " | —CH$_2$CH$_2$SCH$_2$CH$_2$— | " |
| H | 3-CH$_2$CN—4-CN | " | " | " | —CH$_2$CH(C$_6$H$_5$)— | " |
| H | 3-CH$_2$CONH$_2$—4-CN | " | " | " | —CH$_2$CH(CH$_3$)— | " |
| H | 4-CN | " | " | " | —CH$_2$CH(OH)CH$_2$— | " |
| " | " | " | " | " | —CH$_2$CH(Cl)CH$_2$— | " |
| " | " | " | " | " | —CH$_2$CH(CH$_2$OCH$_2$CH$_3$)— | " |
| " | " | " | " | " | —CH$_2$CH(CH$_2$OC$_6$H$_5$)— | " |
| " | " | " | " | " | —CH$_2$CH$_2$N(SO$_2$CH$_3$)CH$_2$CH$_2$— | " |
| " | " | " | " | " | —CH$_2$CH$_2$CH$_2$NHSO$_2$CH$_2$CH$_2$— | " |
| " | " | " | " | " | —CH$_2$CH$_2$SO$_2$NHCH$_2$CH$_2$— | " |
| " | " | " | " | " | —CH$_2$CH$_2$NHCOCH$_3$— | " |
| " | " | " | " | " | —CH$_2$CH$_2$NHCOOCH$_2$CH$_2$— | " |
| " | " | " | " | " | —CH$_2$CH$_2$COOCH$_2$CH$_2$— | " |
| " | " | " | " | " | —CH$_2$CH$_2$CONHC$_2$H$_4$— | " |
| " | " | " | " | " | —CH$_2$CH$_2$NHCONHC$_2$H$_4$— | " |
| " | " | " | " | " | —CH$_2$CH$_2$N(SO$_2$C$_6$H$_5$)CH$_2$CH$_2$— | " |
| " | " | " | " | " | —CH$_2$CH$_2$N(COCH$_3$)CH$_2$CH$_2$— | " |
| " | " | " | " | " | —CH$_2$CH$_2$SO$_2$N(C$_6$H$_5$)CH$_2$CH$_2$— | " |
| " | " | " | " | " | —CH$_2$CH$_2$SO$_2$N(CH$_3$)CH$_2$CH$_2$— | " |

TABLE 12

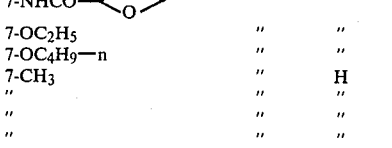

| A | R | $(R_1)_m$ | $R_3$ | Z | M |
|---|---|---|---|---|---|
| H | 4-CN | 6-CH$_3$ | H | —CH$_2$CH$_2$— | K$^+$ |
| " | " | H | H | " | " |
| CH$_3$ | " | " | CH$_3$ | " | " |
| " | 4-COOCH$_3$ | 6-CH$_3$ | " | " | " |
| " | 4-COOC$_2$H$_4$OC$_2$H$_5$ | " | " | —CH$_2$CH$_2$CH$_2$CH$_2$— | " |
| " | 4-CONH$_2$ | 6-OCH$_3$ | " | " | " |
| " | 4-CONHC$_2$H$_4$OH | " | " | —CH$_2$CH$_2$— | " |
| " | 4-CONHC$_3$H$_6$OCH$_3$ | 6-CH$_3$ | " | —CH$_2$CH$_2$OCH$_2$CH$_2$— | " |
| " | 4-CONHC$_2$H$_4$NHCOCH$_3$ | " | " | —CH$_2$CH$_2$SO$_2$CH$_2$CH$_2$— | " |

TABLE 12-continued

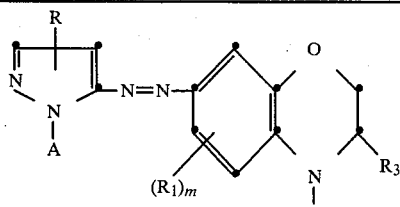

| A | R | $(R_1)_m$ | $R_3$ | Z | M |
|---|---|---|---|---|---|
| —CH$_2$CH$_3$ | 4-CN | " | " | —CH$_2$CH$_2$SCH$_2$CH$_2$— | " |
| C$_6$H$_5$ | " | " | " | —CH$_2$CH(CH$_3$)— | " |
| " | 4-COOCH$_2$CH$_3$ | " | " | —CH$_2$CH(C$_6$H$_5$)— | " |
| " | 4-CONH$_2$ | 6-OC$_2$H$_5$ | " | —CH$_2$CH$_2$— | " |
| C$_6$H$_4$—o-Cl | " | 6-NHCOCH$_3$ | " | " | Na$^+$ |
| H | " | 6-NHCOH | " | " | " |
| " | 4-COOCH$_3$ | 6-NHCOCH$_2$OCH$_3$ | " | " | " |
| " | " | 6-NHCOCH$_2$Cl | " | " | " |
| " | 4-CONHC$_4$H$_9$—n | 6-NHCOCH$_2$CN | " | " | " |
| " | " | 6-NHCOCH$_2$CONH$_2$ | " | " | " |
| " | " | 6-NHCOCH$_2$OC$_6$H$_5$ | " | " | " |
| SO$_2$CH$_3$ | 4-CN | 6-NHCOOC$_2$H$_5$ | " | " | " |
| " | 4-COOCH$_3$ | 6-NHCONHC$_2$H$_5$ | " | " | " |
| H | 3-CH$_2$CN—4-CN | 6-NHCOC$_6$H$_5$ | " | " | " |
| C$_6$H$_5$ | 3-SCH$_3$—4-CN | 6-NHCOC$_6$H$_{11}$ | " | " | " |
| " | 3-SCH$_2$CH$_3$—4-CN | 6-NHSO$_2$CH$_3$ | " | " | " |
| " | 3-SCH$_2$CH$_3$—4-COOCH$_3$ | 6-NHCOCH$_2$CH$_2$OCOCH$_3$ | " | " | " |
| " | 3-SCH$_3$—4-CONHC$_4$H$_9$—n | 6-NHCO—furan | " | " | " |
| SO$_2$C$_6$H$_5$ | 4-CN | 6-NHCOCH$_2$CH$_2$CH$_2$OH | " | " | " |
| " | 4-COOCH$_3$ | 6-CH$_3$ | " | —CH$_2$CH$_2$CH$_2$ | " |
| SO$_2$C$_6$H$_4$—p-CH$_3$ | 4-CN | " | " | —CH$_2$CH$_2$— | " |
| SO$_2$C$_4$H$_9$—n | " | " | " | " | " |
| COCH$_3$ | " | " | " | " | " |
| COOC$_2$H$_5$ | " | " | " | " | " |
| CH$_2$CH$_2$OH | H | " | " | " | " |
| C$_6$H$_4$—o-CH$_3$ | " | " | " | " | " |
| " | 4-COOCH$_3$ | " | " | " | " |
| " | 4-COOCH(CH$_3$)$_2$ | " | H | —CH$_2$CH(CH$_3$)— | " |
| SO$_2$C$_6$H$_{11}$ | " | " | CH$_3$ | —CH$_2$CH$_2$N(SO$_2$CH$_3$)CH$_2$CH$_2$— | K$^+$ |
| H | 4-CN | " | " | —CH$_2$CH$_2$SO$_2$NHCH$_2$CH$_2$— | " |
| " | " | " | " | —CH$_2$CH$_2$SO$_2$N(CH$_3$)CH$_2$CH$_2$CH$_2$— | " |
| " | " | " | " | —CH$_2$CH$_2$SO$_2$N(C$_6$H$_5$)CH$_2$CH$_2$— | " |
| " | " | " | " | —CH$_2$CH$_2$SO$_2$N(C$_6$H$_{11}$)CH$_2$CH$_2$— | " |
| " | " | " | " | —CH$_2$CH$_2$CH$_2$CH$_2$N(SO$_2$CH$_3$)CH$_2$CH$_2$— | " |
| " | " | " | " | —CH$_2$CH$_2$N(SO$_2$C$_6$H$_4$—p-CH$_3$)—CH$_2$CH$_2$— | " |
| " | " | " | " | —CH$_2$CH$_2$N(SO$_2$C$_6$H$_{11}$)CH$_2$CH$_2$— | " |
| C$_6$H$_5$ | " | " | " | —CH$_2$CH(Cl)CH$_2$— | " |
| " | " | " | " | —CH$_2$CH(OH)CH$_2$— | " |
| " | " | " | " | —CH$_2$CH(CH$_2$OCH$_3$)— | " |
| " | " | " | " | —CH$_2$CH(CH$_2$OC$_6$H$_5$)— | " |
| " | " | " | " | —CH$_2$CH(OCOCH$_3$)CH$_2$— | " |
| " | " | " | " | —CH$_2$CH$_2$NHCOCH$_2$— | " |
| " | " | " | " | —CH$_2$CH$_2$CONHC$_2$H$_4$— | " |
| " | " | " | " | —CH$_2$CH$_2$NHCOOCH$_2$CH$_2$— | " |
| " | " | " | " | —CH$_2$CH$_2$COOCH$_2$CH$_2$— | " |
| " | " | " | " | —CH$_2$CH$_2$NHCONHCH$_2$CH$_2$— | " |
| " | " | " | " | —CH$_2$CH$_2$N(COCH$_3$)CH$_2$CH$_2$— | " |
| " | " | " | " | —CH$_2$CH$_2$N(COC$_6$H$_5$)CH$_2$CH$_2$— | " |

TABLE 13

Structure: R-(thiophene)-N=N-C6H3(R1)m-N(R2)(Z-SSO3M)

| R | (R1)m | R2 | Z | M |
|---|---|---|---|---|
| 3,5-di-CN—4-CH3 | 2-CH3 | H | —CH2CH2— | K+ |
| " | 2-Cl | " | " | " |
| " | 2,5-di-Cl | " | " | " |
| " | 2,5-di-OCH3 | " | " | " |
| 3-CN—5-C6H5 | 3-OCH3 | —C2H5 | " | " |
| 3-COOCH3—5-C6H5 | 2-OCH3, 5-NHCOCH3 | H | " | " |
| 3-CONH2—5-C6H5 | 2-CH3, 3-Cl | " | " | " |
| 3-CONHC2H5—5-C6H5 | 2-OCH3, 5-Cl | " | " | " |
| 3-COOCH3 | 3-NHCOCH3 | —C2H5 | " | " |
| 3-CN | 3-NHCOC2H5 | —C2H4OCH3 | " | " |
| 3-CN—4-CH3—5-COOC2H5 | 3-NHCOCH2OH | —CH2C6H5 | " | " |
| " | 3-NHCOCH2OCH3 | —C6H11 | " | " |
| H | 3-NHCOC6H5 | —CH2C6H11 | " | " |
| " | 3-NHCOC2H5 | —CH2CH2OC6H5 | " | " |
| 3-CN—4-CH3—5-COCH3 | 3-NHCONHC2H5 | —CH2CH2OH | " | " |
| 3-COOCH3—4-CH3—5-CN | 3-NHCOC6H5 | —CH2CN(CH3)2 | " | " |
| 3-COOCH3—4-CH3—5-COC6H5 | 3-NHCOCH2CN | —CH2CH2CH3 | " | " |
| 3-COOCH3—5-COC6H5 | 3-NHCOCH2OC6H5 | —CH2CH2OCOCH3 | " | " |
| 3-COOCH3—5-COCH(CH3)2 | 3-NHCOCH2C6H5 | —CH2CH2CONH2 | " | " |
| " | 3-CH3 | —CH2CH2NHCOCH3 | " | " |
| " | " | —CH2CH2NHSO2CH3 | " | " |
| " | " | —CH2CH2SO2NH2 | " | " |
| " | " | —CH2CH2SO2CH3 | " | " |
| " | " | —CH2CH2SCH3 | " | " |
| " | H | —CH2C6H11 (with COCH2-N-COCH2 ring) | " | " |
| " | " | —CH2CH2CH2N(CH2CH2-CO-CH2CH2) morpholine | " | " |
| 3-SO2C6H5—5-COCH3 | " | —CH2CH2N(CO-C6H4-CO) phthalimide | —CH2CH2CH2— | Na+ |
| 3-SO2CH3—5-CN | " | " | " | " |
| 3-SO2C6H5—5-Br | " | " | " | " |
| 3,5-di-SO2CH3 | 3-OC6H5 | —C6H5 | —CH2CH2— | NH4+ |
| 3,5-di-SO2NH2 | 3-CH3 | —CH2—(furan) | —CH2CH2— | Na+ |
| 3,5-di-SO2N(C2H5)2 | " | " | —CH2CH(CH2OC6H5)— | " |

TABLE 13-continued

[Structure: R-(thiazole)-N=N-phenyl(R1)m-N(R2)-Z-SSO3M]

| R | (R1)m | R2 | Z | M |
|---|---|---|---|---|
| 3-CN—5-COCH3 | | —CH2CH2COOCH3 | —CH2CH(C6H5)— | " |
| 3-CN—5-COCH(CH3)2 | | —CH2CH2CN | —CH2CH(CH3)— | " |
| 3-CN—S—COOC2H5 | | —C2H5 | —CH2CH(OH)CH2— | " |
| 3-CONH2—5-COOC2H5 | 2-CH3S | H | —CH2CH2CH2— | " |
| 3-CONH2—5-COCH(CH3)2 | 3-CH3 | —C2H4OC2H4OC2H5 | —CH2CH(OCOCH3)CH2— | " |
| 3-CONH2CH2OH—5-COCH(CH3)2 | | —CH2CH(OH)CH2Cl | —CH2CH2— | " |
| " | 2-OCH3, 5-CH3 | —C2H5 | " | " |
| " | | H | —CH2CH2OCH2CH2— | " |
| " | 3-CH3 | H | —CH2CH2SO2CH2CH2— | K+ |
| 3-CONHC3H6OCH3—S—COCH(CH3)2 | | C2H5 | —CH2CH2SCH2CH2— | " |
| 3-CONHC4H9OH—n-5-COCH(CH3)2 | " | " | —CH2CH2N(SO2CH3)CH2CH2— | " |
| 3-CONHC2H4OH—5-COCH(CH3)2 | " | " | —CH2CH2NHSO2CH2CH2CH2CH2— | " |
| 3-COOCH3—5-SO2CH3 | " | " | —CH2CH2SO2NHCH2CH2— | " |
| 3-CONHC2H5—5-SO2CH3 | " | " | —CH2CH2N(COCH3)CH2CH2— | " |
| 3-CONH2—5-SO2C2H5 | " | " | —CH2CH2CONHC2H4— | " |
| 3-CONH2—5-SO2C4H9-n | " | " | —CH2CH2NHCOCH2— | " |
| 3-COOCH3—4-CH3—5-SCN | " | " | —CH2CH2N(SO2C6H5)CH2CH2— | " |
| 3-CHO—4-CH3 | " | " | —CH2CH2SO2N(C6H5)CH2CH2— | " |
| 3-CONH2—5-C6H4—p-CH3 | " | " | —CH2CH2SO2N(SO2C6H11)CH2CH2— | " |
| 3-CN—5-COOC2H5 | " | " | —CH2CH2N(COCH3)CH2CH2— | " |
| 3-COOCH3—5-COCH(CH3)2 | " | " | —CH2CH(CH2OCH3)— | " |
| " | " | " | —CH2CH(Cl)CH2— | " |
| " | " | " | —CH2CH2NHCONHC2H4— | " |
| " | " | " | —CH2CH2NHCOOCH2CH2— | " |
| " | " | " | —CH2CH2COOCH2CH2— | " |

TABLE 14

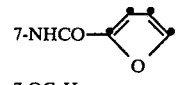

| R | (R₁)ₘ | R₃ | R₄ | Z | M |
|---|---|---|---|---|---|
| 3-CONHC₂H₅—5-COCH(CH₃)₂ | H | CH₃ | CH₃ | —CH₂CH₂— | K⁺ |
| " | 7-CH₃ | " | " | " | " |
| 3-CONH₂—5-COCH(CH₃)₂ | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| H | 8-OC₂H₅ | H | H | " | " |
| " | 7-CH₃ | " | " | " | " |
| 3-COOCH₃—5-COCH(CH₃)₂ | 7-NHCOCH₃ | CH₃ | CH₃ | " | Na⁺ |
| " | 7-NHCOH | " | " | " | " |
| " | 7-NHCOCH₂OCH₃ | " | " | " | " |
| " | 7-NHCOCH₂OC₆H₅ | H | CH(CH₃)₂ | " | " |
| " | 7-NHCOCH₂C₆H₅ | " | " | " | " |
| 3,5-di-CN—4-CH₃ | 7-NHCOCH₂Cl | " | " | " | " |
| " | 7-NHCOC₆H₅ | " | " | " | " |
| " | 7-NHCOC₆H₁₁ | CH₃ | CH₃ | " | " |
| " | 7-NHCONHC₂H₅ | " | " | " | " |
| " | 7-NHSO₂CH₃ | " | " | " | " |
| 3-CONH₂—5-C₆H₅ | 7-NHCOCH₂CN | " | " | " | " |
| " | 7-NHCOCH₂OH | " | " | " | " |
| 3-COOCH₃—5-C₆H₅ | 7-NHCOOC₂H₅ | " | " | —CH₂CH₂CH₂— | " |
| 3-COOCH₃—5-COCH₃ | 7-NHCOCH₂CH₂OCOCH₃ | " | " | " | " |
| 3-CN—5-COOC₂H₅ | 8-OC₄H₉—n | H | CH₃ | —CH₂CH₂— | " |
| 3-CN—4-CH₃—5-COOC₂H₅ | 7-CH₃ | CH₃ | H | " | " |
| 3-CN—4-CH₃—5-COCH₃ | " | " | CH₃ | " | " |
| " | 7-NHCO—[oxazole] | " | " | " | " |
| 3-COOCH₃—4-CH₃—5-CN | 7-OC₂H₅ | " | " | " | " |
| 3-CN—4-CH₃—5-CO₂CH₂CH₂OC₂H₅ | 7-OC₄H₉—n | " | " | " | " |
| 3-SO₂C₆H₅—5-COCH₃ | 7-CH₃ | " | H | " | " |
| 3-SO₂C₆H₄—p-Cl—5-COCH₃ | " | " | " | " | " |
| 3-SO₂CH₃—5-CN | " | " | " | —CH₂CH₂CH₂CH₂— | " |
| 3-COOCH₃—5-Br | " | " | " | —CH₂CH₂— | " |
| 3-COOCH₃—5-SCN | " | " | " | " | " |
| 3-CONHC₂H₄OH—5-COCH(CH₃)₂ | " | " | " | " | " |
| 3-CONHC₃H₆OCH₃—5-COCH(CH₃)₂ | " | " | " | —CH₂CH₂SO₂CH₂CH₂— | K⁺ |
| 3-CN—5-SO₂CH₃ | " | " | " | —CH₂CH₂OCH₂CH₂— | " |
| 3,5-di-SO₂NH₂ | " | " | " | —CH₂CH₂SCH₂CH₂— | " |
| 3,5-di-SO₂NHC₂H₅ | " | " | " | —CH₂CH(C₆H₅)— | " |
| 3-COOCH₃—5-COC₆H₅ | " | " | " | —CH₂CH(CH₃)— | " |
| 3-CONHC₄H₉—n-5-COC₆H₅ | " | " | " | —CH₂CH(OH)CH₂— | " |
| 3-COOCH₃—5-SO₂CH₃ | " | " | " | —CH₂CH(Cl)CH₂— | " |
| 3-CONHC₂H₄OH—5-SO₂CH₃ | " | " | " | —CH₂CH(CH₂OCH₂CH₃)— | " |
| 3-CHO | " | " | " | —CH₂CH(CH₂OC₆H₅)— | " |
| 3-SO₂C₆H₅ | " | " | " | —CH₂CH₂N(SO₂CH₃)CH₂CH₂— | " |
| 3-CONHC₂H₅—5-COCH(CH₃)₂ | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| " | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| 3-COOCH₃—4-CH₃—5-CONH₂ | " | " | " | —CH₂CH₂SO₂N(C₆H₅)CH₂CH₂— | " |
| " | " | " | " | —CH₂CH₂SO₂N(CH₃)CH₂CH₂— | " |

TABLE 15

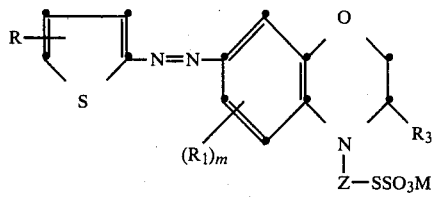

| R | (R1)m | R3 | Z | M |
|---|---|---|---|---|
| 3-COOCH3—5-COCH(CH3)2 | 6-CH3 | H | —CH2CH2— | K+ |
| 3-CONH2—5-COCH(CH3)2 | H | H | " | " |
| 3-CN—5-COCH(CH3)2 | " | CH3 | " | " |
| " | 6-CH3 | " | " | " |
| 3-CONH2—5-C6H5 | " | " | —CH2CH2CH2CH2— | " |
| " | 6-OCH3 | " | " | " |
| " | " | " | —CH2CH2— | " |
| 3-CN—5-C6H5 | 6-CH3 | " | —CH2CH2OCH2CH2— | " |
| 3-CONHC2H4OH—5-C6H5 | " | " | —CH2CH2SO2CH2CH2— | " |
| 3-CONHC2H5—5-COC6H5 | " | " | —CH2CH2SCH2CH2— | " |
| 3-CONHCH3—5-COC6H5 | " | " | —CH2CH(CH3) | " |
| 3-CN—4-CH3—5-COOC2H5 | " | " | —CH2CH(C6H5)— | " |
| 3-CN—4-CH3—5-COOC2H4OCH3 | 6-OC2H5 | " | —CH2CH2— | " |
| 3-CHO—4,5-di-CH3 | 6-NHCOCH3 | " | " | Na+ |
| 3-CN—4-CH3—5-SCH3 | 6-NHCOH | " | " | " |
| 3-COOCH3—4-CH3—5-CONH2 | 6-NHCOCH2OCH3 | " | " | " |
| 3-CONH2—4-CH3—5-CN | 6-NHCOCH2Cl | " | " | " |
| 3,5-di-CN—4-CH3 | 6-NHCOCH2CN | " | " | " |
| " | 6-NHCOCH2CONH2 | " | " | " |
| H | 6-NHCOCH2OC6H5 | " | " | " |
| " | 6-NHCOOC2H5 | " | " | " |
| 3-CONH2—4-CH3—5-COOCH3 | 6-NHCONHC2H5 | " | " | " |
| 3-SO2CH3—5-COCH3 | 6-NHCOC6H5 | " | " | " |
| 3-SO2C6H5—5-COCH3 | 6-NHCOC6H11 | " | " | " |
| 3-SO2C6H4—p-Cl—5-COCH3 | 6-NHSO2CH3 | " | " | " |
| 3-SO2CH3—5-Br | 6-NHCOCH2CH2OCOCH3 | " | " | " |
| 3,5-di-SO2CH3 | 6-NHCO—⟨furan⟩ | " | " | " |
| 3,5-di-SO2NH2 | 6-NHCOCH2CH2CH2OH | " | " | " |
| 3,5-di-SO2NHC2H5 | 6-CH3 | " | —CH2CH2CH2— | " |
| 3-CONHC2H4OH—5-COCH(CH3)2 | " | " | —CH2CH2— | " |
| 3-CONHC3H6OCH3—5-COCH(CH3)2 | " | " | " | " |
| 3-CONHC2H4NHCOCH3 | " | " | " | " |
| 3-CONHC4H9—n-5-C6H5 | " | " | " | " |
| 3-CN—5-COOC2H5 | " | " | " | " |
| 3-CN—4-CH3—5-COOCH(CH3)2 | " | " | " | " |
| 3-CN—4-CH3—5-CONHC2H5 | " | " | " | " |
| 3-CN—4-CH3—5-CONHC6H5 | " | H | —CH2CH(CH3)— | " |
| 3-CONH2—5-SO2CH3 | " | CH3 | —CH2CH2N(SO2CH3)CH2CH2— | K+ |
| 3-CONH2—5-COCH(CH3)2 | " | " | —CH2CH2SO2NHCH2CH2— | " |
| " | " | " | —CH2CH2SO2N(CH3)CH2CH2CH2— | " |
| " | " | " | —CH2CH2SO2N(C6H5)CH2CH2— | " |
| " | " | " | —CH2CH2SO2N(C6H11)CH2CH2— | " |
| " | " | " | —CH2CH2CH2CH2N(SO2CH3)CH2CH2— | " |
| " | " | " | —CH2CH2N(SO2C6H4—p-CH3)—CH2CH2— | " |
| " | " | " | —CH2CH2N(SO2C6H11)CH2CH2— | " |
| 3-CONHC2H5—5-COCH(CH3)2 | " | " | —CH2CH(Cl)CH2— | " |
| " | " | " | —CH2CH(OH)CH2— | " |
| " | " | " | —CH2CH(CH2OCH3)— | " |
| " | " | " | —CH2CH(CH2OC6H5)— | " |
| " | " | " | —CH2CH(OCOCH3)CH2— | " |
| " | " | " | —CH2CH2NHCOCH2— | " |
| " | " | " | —CH2CH2CONHC2H4— | " |
| " | " | " | —CH2CH2NHCOOCH2CH2— | " |
| " | " | " | —CH2CH2COOCH2CH2— | " |
| " | " | " | —CH2CH2NHCONHCH2CH2— | " |
| " | " | " | —CH2CH2N(COCH3)CH2CH2— | " |
| " | " | " | —CH2CH2N(COC6H5)CH2CH2— | " |

The invention has been described in detail with particular reference to preferred embodiments thereof, but it will be understood that variations and modifications can be effected within the spirit and scope of the invention.

We claim:

1. A compound of the formulae D-N=N-Coupler, wherein D is selected from the heterocyclic amines of the formulae

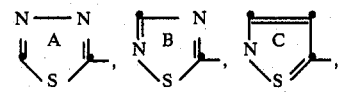

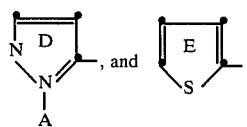

wherein
- ring A is unsubstituted or substituted with a group selected from alkyl, alkoxy, halogen, alkylsulfonyl, $SO_2$-aryl, $SO_2NH_2$, $SO_2NH$-alkyl, $SO_2N$-(dialkyl), alkanoylamino, aryl, arylthio, alkenylthio, cyclohexylthio, thiocyano, cyclohexylsulfonyl, alkylthio, and cyclohexyl;
- ring B is unsubstituted or substituted with a group selected from alkyl, aryl, alkylthio, cyclohexylthio and alkylsulfonyl;
- ring C is unsubstituted or substituted with one or two groups selected from alkyl, halogen, cyano, carbamoyl, CONH-alkyl, alkoxycarbonyl, alkylthio, alkenylthio, arylthio, cyclohexylthio, aryloxy, and alkoxy;
- ring D is unsubstituted or substituted with one or two groups selected from alkyl, alkoxycarbonyl, alkylthio, aryl, cyano, carbamoyl, alkyl carbamoyl, alkylcarbonyl and alkyl sulfonyl; and the A group on the 1-nitrogen of ring D is hydrogen, alkyl, alkoxycarbonyl, aryl, alkylsulfonyl, arylsulfonyl, or alkanoyl;
- ring E is unsubstituted or substituted with one to three groups selected from alkyl, cyano, alkoxycarbonyl, alkanoyl, aroyl, alkylsulfonyl, arylsulfonyl, carbamoyl, alkyl carbamoyl, aryl, halogen, sulfamoyl, and formyl;
- wherein the various alkyl or alkylene portions of the above groups are unsubstituted or substituted with one to three groups selected from hydroxy, halogen, alkoxy, aryl, aryloxy, cyclohexyl, alkylcyclohexyl, acyloxy, alkoxy carbonyl, acylamido, alkylsulfonamido, succinimido, glutarimido, phthalimido, 2-pyrrolidono, cyano, carbamoyl, alkoxyalkoxy, alkylthio, halogen, arylthio, alkylsulfonyl and arylsulfonyl;
- and wherein the various above aryl groups are unsubstituted or substituted with one to three groups selected from alkyl, alkoxy, halogen, alkoxy carbonyl, alkyl sulfonyl, and alkylthio; and
- the Coupler is selected from those of the formulae

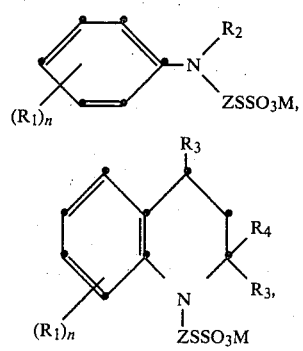

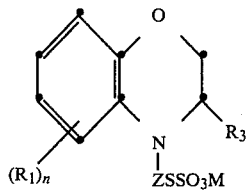

wherein $R_1$ is selected from hydrogen; alkyl; halogen; alkoxy; aryloxy; —NHCO—$R_5$; —NHSO$_2$—$R_5$; wherein $R_5$ is selected from alkyl and alkyl substituted with hydroxy, alkoxy, cyano, aryloxy, aryl, halogen, cycloalkyl, alkyl carbonyloxy, or carbamoyl; aryl; alkylamine; and 2-furyl; $R_2$ is selected from hydrogen; aryl; cycloalkyl; alkyl and alkyl substituted with alkoxy, alkoxyalkoxy, hydrogen, aryloxy, aryl, cycloalkyl, alkylcycloalkyl, furyl, NHCOR$_5$, NHSO$_2$R$_5$, aryloxy, carbamoyl, alkyl carbamoyl, cyano, alkanoyloxy, halogen, alkoxycarbonyl, succinimido, glutarimido, phthalimido, 2-pyrrolidono, sulfamoyl, alkyl substituted sulfamoyl, alkylsulfonamido, NHSO$_2$-aryl, NHCOO-alkyl, NHCONH-alkyl, formamido, alkylsulfonyl, arylsulfonyl, alkylthio, arylthio, or SO$_3$M; n is 0, 1 or 2; M is Na$^+$, K$^+$, NH$_4$$^+$, or H$^+$; $R_3$ and $R_4$ are each selected from hydrogen or alkyl; Z is selected from straight or branched chain alkylene; alkylene substituted with aryl, aryloxy, alkoxy, halogen, aryloxy or SO$_3$M; —CH$_2$(CH$_2$)$_m$—X—CH$_2$(CH$_2$)$_p$, where m is 1, 2, or 3, p is 0, 1, 2, or 3, and X is O, S, SO$_2$, —SO$_2$NH—,

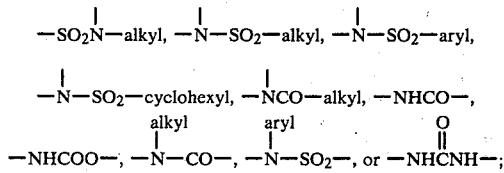

and the various aryl groups on the couplers are unsubstituted or substituted with alkyl, alkoxy, or halogen.

2. A compound according to claim 1 wherein $R_1$ is selected from hydrogen, alkyl, and alkoxy; $R_2$ is selected from hydrogen and alkyl; and Z is straight or branched chain alkylene.

3. A compound according to claim 1 having the formula

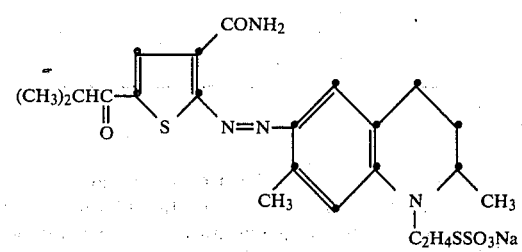

4. A compound according to claim 1 having the formula

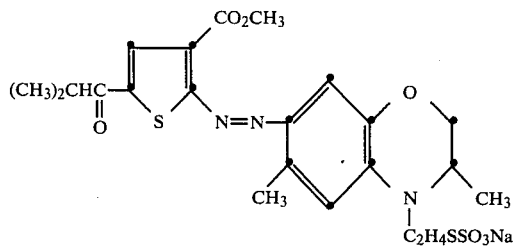
5. A compound according to claim 1 having the formula
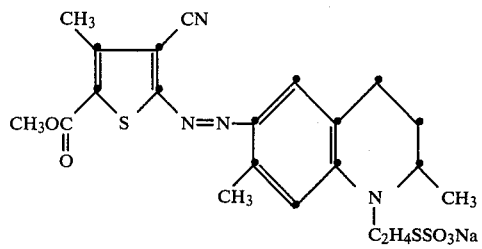
6. A compound according to claim 1 having the formula
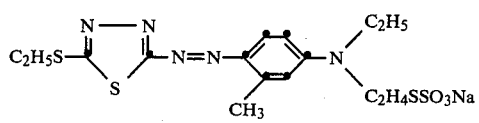
7. A compound according to claim 1 having the formula
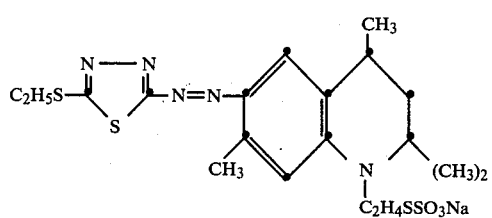
8. A compound according to claim 1 having the formula
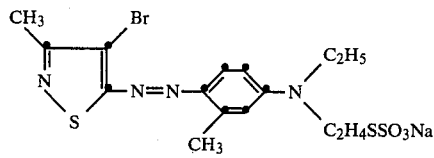
9. A compound according to claim 1 having the formula
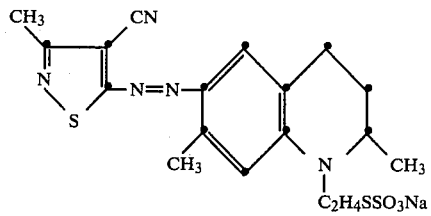
10. A compound according to claim 1 having the formula
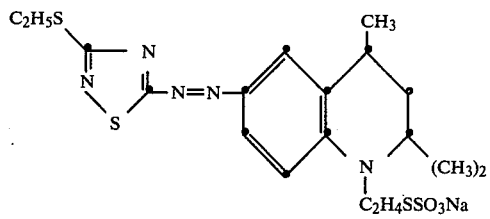
11. A compound according to claim 1 having the formula
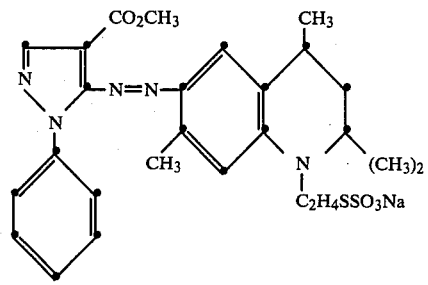
* * * * *

UNITED STATES PATENT AND TRADEMARK OFFICE
CERTIFICATE OF CORRECTION

PATENT NO. : 4,301,069

DATED : November 17, 1981

INVENTOR(S) : Max A. Weaver and Clarence A. Coates, Jr.

It is certified that error appears in the above—identified patent and that said Letters Patent is hereby corrected as shown below:

Column 42, line 65, the last structural formula (ring C) should read

Column 43, lines 1-7, the first structural formula (ring D) should read

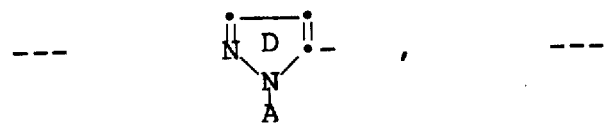

Signed and Sealed this

Eleventh Day of January 1983

[SEAL]

Attest:

Attesting Officer

GERALD J. MOSSINGHOFF

Commissioner of Patents and Trademarks